US012547630B1

(12) United States Patent
Ramaiyer

(10) Patent No.: US 12,547,630 B1
(45) Date of Patent: Feb. 10, 2026

(54) AGGREGATION, ALLOCATION, AND CALCULATION IN HIGH DIMENSION SYSTEMS

(71) Applicant: Workday, Inc., Pleasanton, CA (US)

(72) Inventor: Kumar Ramaiyer, Cupertino, CA (US)

(73) Assignee: Workday, Inc., Pleasanton, CA (US)

( * ) Notice: Subject to any disclaimer, the term of this patent is extended or adjusted under 35 U.S.C. 154(b) by 0 days.

(21) Appl. No.: 18/226,958

(22) Filed: Jul. 27, 2023

(51) Int. Cl.
*G06F 16/2455* (2019.01)
*G06F 16/22* (2019.01)
*G06F 16/23* (2019.01)
*G06F 16/2453* (2019.01)

(52) U.S. Cl.
CPC .... *G06F 16/24556* (2019.01); *G06F 16/2264* (2019.01); *G06F 16/2358* (2019.01); *G06F 16/24542* (2019.01)

(58) Field of Classification Search
CPC ......... G06F 16/24556; G06F 16/24542; G06F 16/2358; G06F 16/2264
See application file for complete search history.

(56) References Cited

U.S. PATENT DOCUMENTS

| | | | | |
|---|---|---|---|---|
| 6,424,967 B1* | 7/2002 | Johnson | ............... | G06F 16/2264 707/999.102 |
| 6,556,983 B1* | 4/2003 | Altschuler | ............ | G06F 16/907 707/E17.011 |
| 6,804,211 B1* | 10/2004 | Klein | .................. | H04L 27/0008 370/280 |
| 7,315,849 B2* | 1/2008 | Bakalash | .......... | G06F 16/24539 707/999.005 |
| 2004/0139061 A1* | 7/2004 | Colossi | ................. | G06F 16/283 |

* cited by examiner

*Primary Examiner* — Van H Oberly
*Assistant Examiner* — Brooks T Hale
(74) *Attorney, Agent, or Firm* — Van Pelt, Yi & James LLP

(57) ABSTRACT

A system, method, and device for evaluating a query is provided. The method includes (i) receiving the query to be evaluated against a data structure, (ii) determining input data corresponding to a subset of the data structure that is to be used in evaluating the query, (iii) determining a solve order for evaluating the query against the input data, (iv) partitioning the input data into a plurality of sub-grids based at least in part on the solve order, (v) processing the plurality of sub-grids to compute corresponding parts of the query, and (vi) evaluating the query based at least in part on the processing of the plurality of sub-grids to obtain a query result.

25 Claims, 13 Drawing Sheets

| Dimension d1 | Dimension d2 | ... | Dimension dk |
|---|---|---|---|
| m1,1 | m2,1 | ... | mk,1 |
| m1,2 | m2,2 | ... | mk,2 |
| ... | ... | ... | ... |
| ... | ... | ... | ... |
| m1,p1 | m2,p2 | ... | mk,pk |

AGGREGATION, ALLOCATION, AND CALCULATION IN HIGH DIMENSION SYSTEMS

BACKGROUND OF THE INVENTION

Query evaluation systems, which capture and model future outcomes, are typically built based on multi-dimensional databases, usually called hypercubes to facilitate analysis. Data in a hypercube is associated with a coordinate tuple, having a value in each of a set of defined dimensions. Dimensions used in planning are usually hierarchical in nature. Dimensions can have attributes which are also often hierarchical. For example, parent elements represent the rollup, or aggregation, of all of the elements "beneath" them in the hierarchy. Some of these hierarchies can be quite high and/or wide (a single parent may represent a rollup of thousands or even millions of children). Query evaluation has long had challenges dealing with large and complex models, especially when the amount of data in hypercubes is increasing.

BRIEF DESCRIPTION OF THE DRAWINGS

Various embodiments of the invention are disclosed in the following detailed description and the accompanying drawings.

FIG. 3 is an example of an input grid for a query according to various embodiments of the present application.

DETAILED DESCRIPTION

Figure 1:
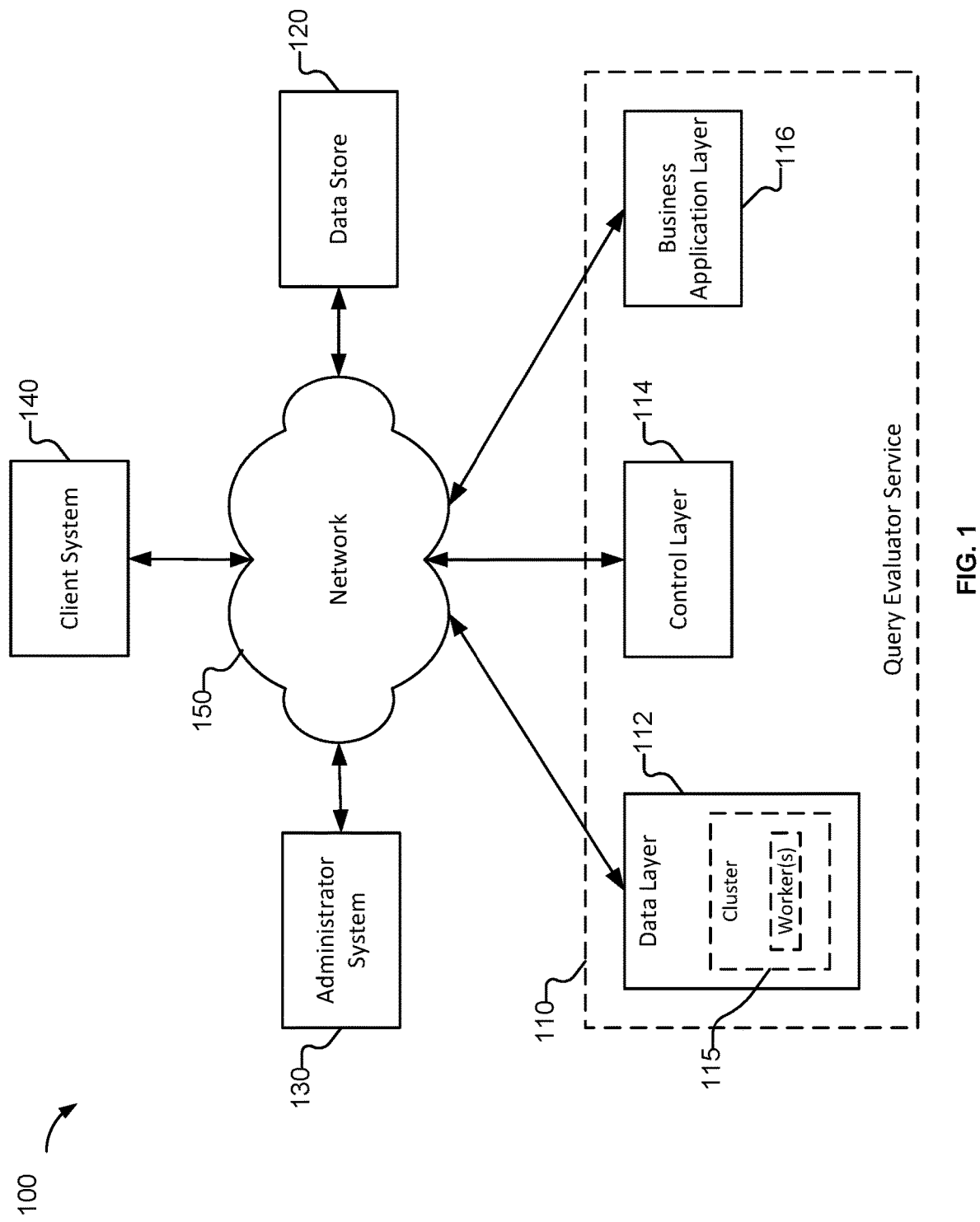
FIG. 1 is a block a diagram of a network system according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, solve order may mean an order in which constraints or equations are solved or evaluated to find a solution to a query or part of the query. The solve order may determine the priority of calculations in the event of competing expressions. The solve order can affect the outcome (e.g., the accuracy) or the efficiency of the solving process. The solve order may be determined based at least in part on dependencies between the constraints or equations that are solved or evaluated to find a solution.

As used herein, pass order may mean a sequence or order in which different parts or components of a query are processed or executed. When a query is submitted to a system, the query typically goes through multiple stages of evaluation and processing. The pass order can define the specific order in which these stages are executed. Each pass or step may involve operations such as parsing the query, optimizing the query execution plan, accessing and filtering data, and performing any necessary computations.

As used herein, an aggregated data point (or aggregated account) may mean a summarized or computed value (e.g., an account) that is derived from multiple data points or records in a database or dataset. It represents a consolidated result of applying an aggregation function to a set of data. When executing queries that involve aggregation, such as grouping data or performing calculations on subsets of data, the result is often a collection of aggregated data points. These data points provide a summary or statistical representation of the underlying dataset. Examples of aggregated data points include (i) sum (e.g., sum of a specific numeric attribute across multiple records/data points), (ii) average (e.g., an average value of a numeric attribute across multiple records/data points), (iii) count (e.g., count of records/data points that satisfy a certain condition or fall within a specific group), (iv) minimum/maximum (e.g., a maximum or minimum value of a specific attribute within a dataset or among a set of data points used in executing a query, including rollup/aggregated accounts), (v) median (e.g., a middle value in a sorted list of numeric values for a set of records or data points), and (vi) mode (e.g., a most frequently occurring value in a dataset or among a set of data points used in executing a query, including rollup or aggregated accounts).

As used herein, an allocated data point (or allocated account) may mean values allocated from a parent or an ancestor tuple to a child or a descendant tuple. In the child or descendant tuple, members from one or more dimensions are descendant in the hierarchy.

As used herein, a calculated data point (or calculated account) may mean a value that is derived or computed based on other data points or through a specified calculation or formula. For example, the calculated data point is not directly stored in the database or dataset but is generated dynamically during the query evaluation process. Calculated data points can involve various mathematical or logical operations, such as addition, subtraction, multiplication, division, aggregations, comparisons, or custom functions. They allow for the creation of new metrics or derived values that can be useful for analysis, reporting, or decision-making.

As used herein, a metric data point (or metric account) may include a data point/account comprising a formula. The value of the data point at any location including dimension/hierarchy/rollup locations is obtained based on evaluating the formula at that location. The metric data point can be used to quantify or measure a particular aspect of interest.

As used herein, BigInteger may mean a class used for the mathematical operation which involves big integer calculations (e.g., calculations involving integers with a large number of digits) that are outside the limit of all available primitive data types. BigInteger may be defined in Java.

As used herein, input data can correspond to a set of data points used in evaluating a query. In some embodiments, the input data is represented in an input grid. The input grid can comprise data points that are an input data point, a loaded data point, a calculated data point, a metric data point, a calculated data point that is based on a metric data point, an allocated data point(s), a calculated data point based on an allocated data point(s), etc.

Planning, reporting, and analytical systems built on top of multi-dimensional databases (e.g., hypercubes) face challenges in scalability due to a combinatorial expansion in the number of calculations required for calculation of hierarchical aggregations and formulas. For example, a multidimensional database that stores transactions in tuples of customer name, location, and stock keeping unit (SKU) might have 1000 customers, in 100 locations, purchasing at least one of 100s of different SKUs, resulting in 1000×100×100=10 million unique combinations of customer, location, and SKU, and for each unique combination, the number of possible paths for calculating aggregations grows as a factorial of these combinations.

Related art systems for calculating aggregations and formulas suffer from problems, including over-specification, over precomputation, over re-computation, over computation, repeat aggregation, and repeat scanning. Each of these is further described below:

Over-Specification: In general, requesting cells one wants is difficult to accomplish in a compact way. The system often ends up specifying tuples using a cartesian product of different dimensional members and this almost always is extremely large and over specified compared to the actual number of cells that are present in the specific slice of the dataset (e.g., the hypercube) being requested. A typical side-effect of the inefficiency associated with over specification is a very large number of empty probes of intersections (i.e., probes that result in NULL or non-existent values).

Over-Pre-Computation: Related art systems generally pre-compute certain values and store those pre-computations in cache, which can become unmanageable or extremely inefficient at scale. For example, such related art systems are inefficient because the pre-computation includes pre-computing more numbers (e.g., through calculations and aggregations) than are actually being requested by a query.

Over Re-Computation: In planning, numbers change unlike transactional systems as users change the numbers to do different what-if analyses. Once the numbers change, all the dependent calculated accounts and only the dependent accounts are required to be re-computed, which can be managed by having well-designed data structures and algorithms for dependency analysis to enable the system to identify what values have changed, and what values need to be correspondingly updated. Related art systems have workloads that wipe out all the "good" calculated values in memory thereby requiring the related art systems to perform unnecessary re-computations.

Over Computation: Related art systems generally perform symmetric calculations according to which all metrics for all existing dimensional combinations for all time periods are computed. Such related art systems are inefficient (e.g., perform superfluous computations of dimensional combinations) when evaluating a query that does not depend on all existing dimensional combinations for all time periods.

Repeat Aggregation: Aggregation in a multi-dimensional space involves overlapping sub-aggregates. For example, in the aggregation shown in FIG. 12, sub-aggregate (SKU, Customers, Region) 1210 is an overlapping aggregate and it is used to compute other aggregates at higher levels (e.g., sub-aggregates data points 1215 and 1220). Related art systems do not take into account that for a query involving large dimensionality, many such overlapping aggregates will exist, and thus related art systems end up performing many repeat aggregations. Performing the repeat aggregations contributes a high portion of the overall query execution time for queries against a large dimensional space.

Repeat Scan: Values at leaf level combinations often represent the largest cardinality compared to any other combination of levels. At scale, the leaf values may not fit in memory. However, leaf values can contribute to multiple aggregates at different levels. Related art systems repeatedly scan the various leaf values when trying to resolve an aggregate that depends on a leaf value. Various embodiments solve this inefficiency and avoid repeat scan of leaf values and aggregate the leaf values to each corresponding data point that depends on the particular leaf value. As described further in connection with FIG. 11, a single scan of a leaf value can be used to aggregate the various data points dependent on the leaf value.

In some embodiments, the system processes a query using solve order with dynamic programming. Related art systems have used solve order to resolve conflicts when evaluating queries, however, such related art systems do not use solve order in conjunction with dynamic programming. Accordingly, various embodiments provide an efficient technique for processing queries.

Various embodiments provide a system, method, and/or device for evaluating a query. The method includes (i) receiving the query to be evaluated against a data structure, (ii) determining input data corresponding to a subset of the data structure that is to be used in evaluating the query, (iii) determining a solve order for evaluating the query against the input data, (iv) partitioning the input data into a plurality of sub-grids based at least in part on the solve order, (v) processing the plurality of grids to compute corresponding parts of the query, and (vi) evaluating the query based at least in part on a processing of the plurality of grids.

Various embodiments provide a query evaluation service/system or method of processing queries with respect to data stored in a dataset (e.g., a hypercube) that enables virtually no limits (e.g., unlimited dimensions, dimension values, and numbers of scenarios to be created easily and calculated rapidly).

The system executes a query, including by: (a) assigning each tuple a unique integer using an algorithm that iterates from leaves upward through each dimension iteratively, (b) analyzing the model to assign a solve order to different data points, (c) partitioning the multidimensional space by a solve order, and (d) applying dynamic programming to the lattice path calculations while evaluating the query in the determined solve order.

The system improves the computer by improving calculation efficiency.

FIG. 1 is a block a diagram of a network system according to various embodiments of the present application. In some embodiments, system 100 implements system 200 of FIG. 2. In some embodiments, system 100 implements process 400 of FIG. 4, process 500 of FIG. 5, process 600 of FIG. 6, process 700 of FIG. 7, process 800 of FIG. 8, and/or process 900 of FIG. 9.

In the example illustrated in FIG. 1, system 100 includes query evaluator service 110, client system 140, and/or administrator system 130. System 100 may additionally include one or more data stores, such as data store 120, and network 150 over which one or more of query evaluator service 110, client system 140, administrator system 130, and data store 120 are connected. In some embodiments, query evaluator service 110 is implemented by a plurality of servers. In various embodiments, network 150 includes one or more of a wired network and/or a wireless network such as a cellular network, a wireless local area network (WLAN), or any other appropriate network. System 100 may include various other systems or terminals.

In some embodiments, query evaluator service 110 is configured to (a) receive a query to be evaluated against a data structure, (b) determine input data corresponding to a subset of the data structure that is to be used in evaluating the query, (c) determine a solve order for evaluating the query against the input data, (d) partition the input data into a plurality of sub-grids based at least in part on the solve order, (e) process the plurality of sub-grids to compute corresponding parts of the query, and (f) evaluate the query, based at least in part on a processing of the plurality of sub-grids, to obtain a query result.

In various embodiments, query evaluator service 110 processes workloads, such as at scale for big data evaluations across datasets that are sparsely populated (e.g., datasets having significantly large dimensionality). Query evaluator service 110 is configured to receive one or more queries (e.g., business logic to be executed) from another system, such as client system 140.

In response to receiving the one or more queries, query evaluator service 110 (e.g., control layer 114) determines one or more datasets storing data for which the other system is seeking to evaluate. For example, query evaluator service 110 determines the input data (e.g., an input grid) for data points that are to be used/evaluated in connection with evaluating the query. In response to determining the dataset(s), query evaluator service 110 obtains business logic to be executed (e.g., in connection with evaluating/analyzing the data). In some embodiments, query evaluator service 110 deconstructs the query to determine a set of partitions of the hypercube that are expected to store relevant data (e.g., data relevant to providing a response to the query). In response to determining the set of partitions, query evaluator service 110 generates a plurality of calls (e.g., a set of requests or subqueries) to be evaluated against the dataset for the set of partitions. For example, query evaluator service 110 evaluates queries against only those partitions of the hypercube that are expected to store relevant data. Accordingly, by not evaluating the query against the entirety of the hypercube, query evaluator service 110 provides a very efficient mechanism for evaluating a query. Query evaluator service 110 is further configured to execute the business logic (e.g., evaluating a formula on data points). In connection with executing the business logic, query evaluator service 110 may configure the requisite infrastructure to be used during the execution, including configuring and establishing the connections between the compute resource(s) (e.g., cluster(s) of compute resource(s)) and the applicable data store(s), pooling compute resource(s) (e.g., according to a compute resource allocation strategy), configuring the compute resource(s), and causing the compute resource(s) to execute the business logic.

In response to determining the input data, query evaluator service 110 analyzes the query in conjunction with the input data to determine a solve order for evaluating the query against the input data. For example, query evaluator service 110 determines the data point types and the dependencies and/or hierarchies of data points within the input data. Query evaluator service 110 can determine a solve order using the technique further described in connection with solve order determination module 231 of system 200.

After query evaluator service 110 determines the solve order, query evaluator service 110 partitions the input data into subsets of data to be evaluated. For example, the input data is partitioned into a plurality of sub-grids. The input data may be partitioned based at least in part on the types of data points (e.g., the type of account being evaluated at the data point). In some embodiments, query evaluator service 110 partitions an input grid for the input data into a plurality of sub-grids to ensure that no two data points from different data point types are in the same grid. The plurality of sub-grids comprises data points that have increasing solve order.

Query evaluator service 110 evaluates the query based on evaluating the plurality of sub-grids. In some embodiments, query evaluator service 110 processes a subset of the plurality of sub-grids in parallel. For example, data layer 112 of query evaluator service 110 may comprise cluster 115, which can scale up/down worker nodes to process multiple grids (e.g., sub-grids, or grids resulting from further partitioning of the sub-grids) in parallel. Query evaluator service 110 may determine a subset of the sub-grids that can be processed in parallel based on the solve order and/or dependencies across data points in the various sub-grids.

In response to evaluating the plurality of sub-grids, query evaluator service 110 aggregates the results from processing the plurality of sub-grids. The results may be aggregated to obtain a query result based on the solve order and/or dependencies across data points.

In some embodiments, query evaluator service 110 comprises data layer 112, control layer 114, and/or business application layer 116. Data layer 112, control layer 114, and/or business application layer 116 are respectively implemented by one or more servers. In some embodiments, data layer 112 comprises one or more clusters of compute resources (e.g., cluster 115). In some embodiments, data layer 112, control layer 114, and/or business application layer 116 are implemented on a single server or a plurality of servers. For example, data layer 112 and business application layer 116 are different modules running on a same server or set of servers.

Data layer 112 obtains a query received by query evaluator service 110 and processes the query to provide result data, such as in the form of a report. Data layer 112 receives the query, divides the query into a set of requests (e.g., based on the determined solve order and corresponding plurality of sub-grids), processes at least a subset of the set of requests in parallel, and generates result data that is responsive to the query based on results for the set of requests. As an example, the set of requests comprises requests (e.g., subqueries for the sub-grids) that are independent (e.g., the various requests do not have cross dependencies). Each request may correspond to one or more account groups. In some embodiments, the plurality of account groups corresponding to the plurality of requests in the set of requests are independent and without a dependency across any two account groups in the plurality of account groups. The processing the at least the subset of the set of requests in parallel includes evaluating a formula on any associated intersection within a space of more than two dimensions. As an example, at least a subset of the set of requests comprises requests (e.g., subqueries) that are independent (e.g., the various requests do not have cross dependencies).

In some embodiments, data layer 112 comprises a query engine, an execution engine, and a formula evaluator.

The query engine (e.g., an interpretive engine) is a service that receives a query, pre-processes the query, and divides the query into a set of requests (e.g., independent subqueries). In some embodiments, the query includes a matrix request that defines an entity with which the result data for the query intersects, a time element that specifies the intersection over the time dimension, and a formula for evaluating the data at the intersection (e.g., a formula to convert the data to a specific currency, etc.).

The query engine analyzes the query to determine roll up elements and identify roll up elements that overlap, and removes the overlapping elements to ensure each element is only computed once. The query engine uses the dependency of data to determine subqueries and to schedule some subqueries to run in parallel. The unit of parallelization of the subqueries may be based on the dimension of the account being analyzed. As an example, in connection with determining roll up elements and identifying roll up elements that do not overlap, the query engine determines a solve order and dependencies across data points/accounts.

In response to obtaining the query, the query engine is configured to determine relationships between data points that are invoked in evaluating the query, and determine an optimal execution plan to retrieve and compute all the data query. Optimizing the computation time comprises optimizing (e.g., with respect to a cost function) the computation time for evaluating the query, or otherwise minimizing the work to evaluate the query. In some embodiments, the query engine generates a normalized query. The query engine may normalize the query to optimize the extent to which the query (e.g., the subqueries into which the normalized query is divided) includes only distinct, non-overlapping dimensional spaces (e.g., hypercube partitions). For example, the query is normalized based on a determined solve order for evaluating the data points. Generating the normalized query includes scanning through each element (e.g., each data point/account) in the request to group the elements by dimension, and for each dimension, scanning through all values to normalize them to ensure that items that have ancestor-descendant relationships belong to the same group. For example, the query engine scans for one or more elements of the hierarchical ranges that may be combined, sorts the hierarchical ranges by depth, and prunes any elements of a hierarchical range that are descendants of another element of the same hierarchical range.

When the customer creates a data model, the user defines levels for the model, such as defines a tree structure or a flat structure of data, etc. The user then inputs in accordance with the levels. The data model enables ad hoc roll ups for data. For example, to obtain aggregated data for a particular account, data for elements within the hierarchy that are children of the particular account can be rolled up and aggregated. The user may define an ad hoc roll up as a custom rollup element having an associated dimension identifier. The query can specify the roll up to perform, such as by indicating the dimension identifier associated with the desired custom roll up element.

An example of pruning any elements of a hierarchical range that are descendants of another element of the same hierarchical range includes scanning through the sorted elements, determining whether an element is a descendant of a previous element, and if the element is a descendant of the previous element, skipping the element (e.g., because the element will be grouped with the previous elements), and if the element is not a descendant of the previous element, deeming the current element to be a new grouping.

In response to determining the normalized query (e.g., the grouping of data points or account elements), the query engine generates a set of corresponding subqueries (e.g., a set of requests for each grouping or sub-grids). Each request is a sub-request of the original query. Because the set of requests is determined based on the sorting and grouping of data elements (e.g., data points/accounts) invoked by the query, the requests correspond to non-overlapping and independent groups of data. The independency of the set of requests enables query evaluator service 110 (e.g., data layer 112, such as via cluster 115) to execute the set of requests (or a subset thereof) in parallel. Creating the request includes, for each group of accounts, creating a request with the particular data points or accounts.

In response to determining the set of requests, the query engine generates a set of tasks respectively corresponding to the set of requests. The query engine submits the tasks for evaluation. For example, the query engine causes the tasks to be submitted to the execution engine for execution. In some implementations, the parallelization of the set of requests is determined by the query engine. In other implementations, the parallelization of the set of requests may be determined/managed by the execution engine.

In response to processing the query to determine the solve order and specify data space with no overlaps/redundancy, and grouping the elements to be evaluated for parallelization, query evaluator service 110, within a parallelization of the requests, identifies all cells in the data space that has data for the specified computation (e.g., defines a data structure), creates a manner to store each level of roll up to minimize the amount of repeat calculations (e.g., creates a computed data tree index or a leaf pool associated with/indexed by the computed data tree index), and stores unique combinations in the computed data tree index or leaf pool (e.g., where the leaf pool includes a leaf index). When the leaf data (e.g., the unique calculations) is stored in the computed data tree index or leaf pool, the leaf data is organized so that leaf data is grouped according to leaf levels (e.g., dimensional heights). Query evaluator service 110 implements a bottom-up evaluation approach by starting with data and determining the aggregation values to be used for roll-up values. For sparse hypercubes, the aggregation of data and remembering (e.g., indexing) where the data originated from may reduce the number of calculations over a data span. In some embodiments, evaluating the query with respect to the plurality of account groups comprises: 1) computing a plurality of roll-up values based on values for one or more leaves or nodes in the data structure; 2) determining at least a subset of the plurality of roll-up values that corresponds to unique combinations of one or more leaves or nodes of the data structure; and 3) storing, in a leaf pool or computed data tree index, the subset of the plurality of roll-up values corresponding to the unique combinations of the one or more leaves or nodes. In some embodiments, evaluating the query with respect to the plurality of account groups includes 1) for each roll-up value to be computed, determining whether the roll-up value is dependent on one or more previously computed roll-up values stored in a leaf pool; and 2) in response to determining that the roll-up value is dependent on the one or more previously computed roll-up values stored in the leaf pool or indexed by the computed data tree index, retrieving the one or more previously computed roll-up values from the leaf pool and computing the roll-up value based at least in part on the one or more previously computed roll-up values.

The execution engine is a service that executes the query, such as by executing the set of requests associated with the sub-grids determined by the query engine. The execution engine evaluates each request of the set of requests and aggregates the data to obtain a response to the query (e.g., in accordance with the definition of the normalized query obtained by the query engine). The execution engine may generate a data structure for the particular partition (e.g., the dimensional/data space) defined by the particular request being executed. The data structure may be stored in memory (e.g., local memory) for quick evaluation. As the execution engine evaluates the request, the execution engine stores data evaluated at cells within the data structure to a leaf pool, which may be accessed for evaluating data at other cells that are dependent on such values. The data stored in a leaf pool may comprise, or be stored in association with, metadata providing indexing (e.g., a leaf index) or context indicating an origin of a leaf node data (e.g., where/how the value was determined).

The execution engine is configured to identify the filters (e.g., all filters) for each dimension referenced in a particular request and determine the data points or leaf accounts invoked within the particular request. For each leaf account value within the particular request, the execution engine finds rows of leaf data by applying the filters, iterates through the leaf data, records leaf data with a label for each item of leaf data in a pool (e.g., the label may index the context according to which the leaf data originated, such as location in a data structure, formula for deriving the leaf data, etc.), and expands from leaf levels up into the hierarchy to find data associated with higher level nodes required in the normalized query. For example, the execution engine obtains (e.g., determines, evaluates, etc.) values for the leaf nodes at the bottom leaf level for the request, and iterates upwards to a top leaf level, and for each iteration obtains values for the leaf nodes of each of the corresponding leaf levels. The execution engine may call a formula evaluator to evaluate a formula to obtain the corresponding leaf node value. In response to obtaining the values for the leaf nodes in all the corresponding leaf levels for the request, the execution engine aggregates the accounts in accordance with (e.g., as defined by) the normalized query or corresponding request/subquery. The execution engine aggregates the leaf data and higher-level leaf node data to obtain a response (e.g., result data for the query).

The formula evaluator is a service for resolving a formula, such as an arithmetic expression, with respect to identified cells in the data structure (e.g., the dimensional space for a query). For example, the formula evaluator evaluates formulas on any intersection within a space of more than two dimensions. Evaluating the formula includes: (a) creating a matrix query for each node within a formula expression tree within the space of more than two dimensions (e.g., within the dimensional space for the query), (b) executing the matrix query at each node within the formula expression tree, and (c) applying an arithmetic expression to the result set of each node.

Query evaluator service 110 provides the result (e.g., responsive data) for the query to client system 140. For example, query evaluator service 110 uses business application layer 116 to configure a user interface to display the results (e.g., provide a report or a sheet to client system 140), such as in the form of a report.

In some embodiments, data layer 112 manages cluster 115 (e.g., a cluster of compute resources) to execute the business logic of the query (e.g., to process the set of requests/subqueries against the applicable data). For example, data layer 112 establishes the connections between the set of compute resources and the data source(s) and allocates the workload for the business logic across the set of compute resources.

According to various embodiments, business application layer 116 provides an interface via which a user (e.g., using client system 140) may interact with various applications such as a development application for developing a service, application, and/or code, an application to access raw data (e.g., data stored in data store 120), an application to analyze data (e.g., log data), etc. Various other applications can be provided by business application layer 116. For example, a user queries data layer 112 by sending a query/request to business application layer 116, which interfaces with data layer 112 and/or data store 120 to obtain information responsive to the query (e.g., business application layer 116 formats the query according to the applicable syntax and sends the formatted query to data layer 112, such as via control layer 114). As another example, an administrator uses an interface provided/configured by business application layer 116 to configure (e.g., define) one or more security policies including access permissions to information stored on data store 120, permissions to access performance profiles, etc.

Administrator system 130 comprises an administrator system for use by an administrator. For example, administrator system 130 comprises a system for communication, data access, computation, etc. An administrator uses administrator system 130 to maintain and/or configure query evaluator service 110 and/or one or more of data stores (e.g., data store 120). For example, an administrator uses administrator system 130 to start and/or stop services on query evaluator service 110 and/or data store 120, to reboot data store 120, to install software on query evaluator service 110 and/or data store 120, to add, modify, and/or remove data on data store 120, etc. Administrator system 130 communicates with query evaluator service 110 and/or data store 120 via a web-interface. For example, administrator system 130 communicates with query evaluator service 110 and/or data store 120 via a web-browser installed on administrator system 130. As an example, administrator system 130 communicates with query evaluator service 110 and/or data store 120 via an application running on administrator system 130.

In various embodiments, an administrator (or other user associated with a tenant or entity with which the tenant is associated such as a customer) uses administrator system 130 to configure a service provided to a tenant. As an example, the administrator uses administrator system 130 to communicate with query evaluator service 110 to configure the service provided to the tenant. For example, administrator system 130 may communicate with query evaluator service 110 via business application layer 116. In some embodiments, business application layer 116 serves as a gateway via which the administrator may interface to manage, configure, etc. data layer 112, control layer 114, and/or business application layer 116. Administrator system 130 may configure one or more policies for query evaluator service 110, such as one or more security policies and/or one or more compute resource policies, etc.

Data store 120 stores one or more datasets. In various embodiments, the one or more datasets comprise human resources data, financial data, organizational planning data, or any other appropriate data. In some embodiments, data store 120 stores one or more datasets for a plurality of tenants. For example, data store 120 hosts at least part of a software as a service (e.g., a database storing data for the service) for a plurality of tenants such as customers for a provider of the software as a service. In various embodiments, a tenant comprises an organization such as a company, a government entity, a sub-organization of an organization (e.g., a department), or any other appropriate organization. For example, data store 120 comprises one or more database systems for storing data in a table-based data structure, an object-based data structure, etc. In various embodiments, data store 120 comprises one or more of: a business database system, a human resources database system, a financial database system, a university database system, a medical database system, a manufacturing database system, or any other appropriate system. In some embodiments, data store 120 comprises one or more object-oriented database systems.

According to various embodiments, a user uses system 100 (e.g., a client or terminal, such as client system 140, that connects to query evaluator service 110 via network 150) to define business logic and/or to execute such business logic with respect to data (e.g., one or more datasets) stored on data store 120. For example, a user inputs to client system 140 one or more queries to be run against a dataset. In response to receiving the business logic, query evaluator service 110 uses data layer 112 (e.g., a cluster of compute resources) to execute the business logic (e.g., with respect to data stored by data store 120) and provides a result to the user (e.g., via a user interface provided on client system 140). In some embodiments, the result comprises information or a set of information that is responsive to the execution of the business logic. Query evaluator service 110 may enforce one or more security policies with respect to the result, including restricting access to certain information to which the user associated with client system 140 does not have permissions or otherwise masking certain information. In some embodiments, the result comprises a report including information that is responsive to the execution of the business logic or selectable elements (e.g., links such as hyperlinks) that point to information that is responsive to the execution of the business logic. The result may be provided in a data frame, a report, and/or a sheet.

Figure 2:
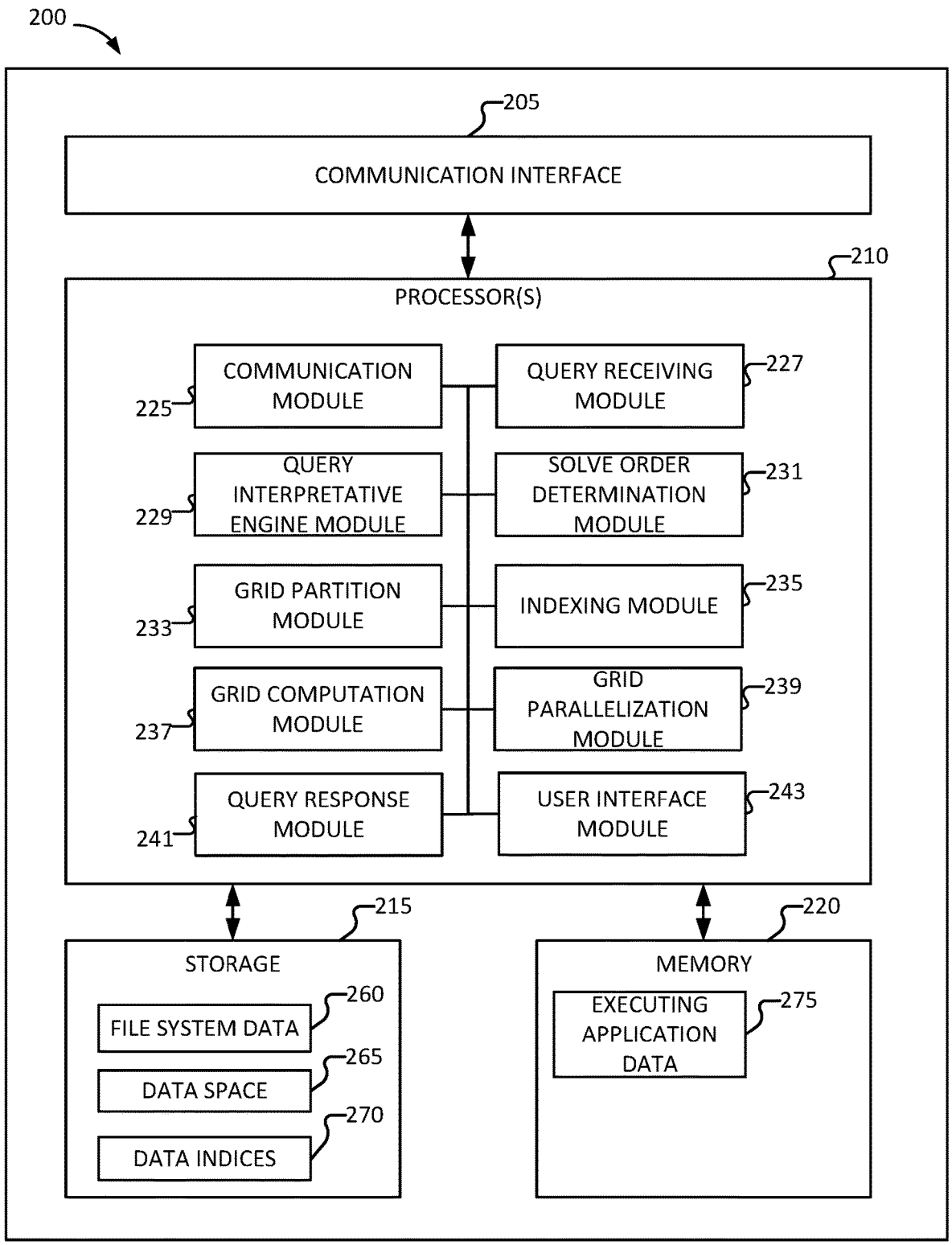
FIG. 2 is a block diagram of a system for providing a query evaluation service according to various embodiments of the present application.

FIG. 2 is a block diagram of a system for providing a query evaluation service according to various embodiments of the present application. In some embodiments, system 200 implements at least part of system 100 of FIG. 1 (e.g., query evaluation service 110). In some embodiments, system 200 implements process 400 of FIG. 4, process 500 of FIG. 5, process 600 of FIG. 6, process 700 of FIG. 7, process 800 of FIG. 8, and/or process 900 of FIG. 9. According to various embodiments, system 200 corresponds to, or comprises, a system for processing a query against a sparsely populated hypercube, including (1) receiving logic for a query, (2) determining a set of locations in the hypercube at which data is expected to be stored, (3) generating a solve order based at least in part on the set of locations, (4) determining a partitioning of input data to be evaluated to process the query, (5) communicating the set of calls to a service (e.g., a query evaluator service) that will query the hypercube based on the partitioning, (6) obtaining the result data for the partitions of input data, and (7) processing the result data to obtain a result for the query.

In some embodiments, system 200 further comprises one or more processors configured to: determine that a change has occurred to the data structure; determine an update to the query result necessitated by the change; and use the solve order to process updated computations for the update on corresponding parts of the plurality of sub-grids impacted by the update. In some embodiments, processing the updated computations includes avoiding a re-computation of values that are not impacted by the change. In some embodiments, the avoiding the re-computation of values that are not impacted by the change comprises identifying the values that are not impacted by the change based on an index for the input data. In some embodiments, the index comprises a plurality of indexes respectively corresponding to the plurality of sub-grids.

A multidimensional request often contains intersections of dimensional spaces. Various embodiments accept queries that allow users to easily specify a list of dimensional spaces to be evaluated. Each dimensional space is defined either as a full tree or sub tree in a hierarchy of that dimension or an ad hoc parent node for which children are some random dimension values. The system accepts a query in which each dimensional space is specified through a value and how the user wants to expand under that value. The system also allows ad hoc aggregation through a simple list of dimension value identifiers for which users want to aggregate data. The query enables the system to capture the entire dimensional space in a single request. By taking advantage of the relationship between data points, the system can determine the most optimal execution plan to retrieve data, and compute all the data query.

In the example shown, system 200 implements one or more modules in connection with providing a query evaluator service, such as to enable users to evaluate data on one or more data sources without requiring the users to configure the infrastructure to execute the evaluation. System 200 comprises communication interface 205, one or more processors 210, storage 215, and/or memory 220. One or more processors 210 comprises one or more of communication module 225, query receiving module 227, query interpretative engine module 229, solve order determination module 231, grid partition module 233, indexing module 235, grid computation module 237, grid parallelization module 239, query response module 241, and/or user interface module 243.

In some embodiments, system 200 comprises communication module 225. System 200 uses communication module 225 to communicate with various client terminals or user systems such as a user system (e.g., client system 140) or an administrator system (e.g., administrator system 130), or other layers of system 100 such as a data layer 112, business application layer 116, data store 120, etc. For example, communication module 225 provides to communication interface 205 information that is to be communicated. As another example, communication interface 205 provides to communication module 225 information received by system 200. Communication module 225 is configured to receive one or more queries or requests to execute business logic (e.g., requests for processing workloads, servicing queries, etc.) such as from various client terminals or user systems (e.g., from the terminals or systems via a business application layer). The one or more queries or requests to execute tasks are with respect to information stored in one or more datasets (e.g., data stored in data store 120). Communication module 225 is configured to provide to various client terminals or user systems information such as information that is responsive to one or more queries or tasks requested to be executed (e.g., user interfaces comprising reports for the results). In some embodiments, communication module 225 provides the information to the various client terminals or user systems in the form of one or more data frames, reports (e.g., according to a predefined format or to a requested format), and/or via one or more user interfaces (e.g., an interface that the user system is caused to display).

In some embodiments, system 200 comprises query receiving module 227. System 200 uses query receiving module 227 to receive a query, such as from a user operating a client terminal (e.g., client system 140).

In some embodiments, system 200 comprises query interpretive engine module 229. Query interpretive engine module 229 may be implemented by the query engine described in connection with system 100. System 200 uses query interpretive engine module 229 to interpret the query to determine relationships between data points that are invoked in evaluating the query, and determine an optimal execution plan to retrieve and compute all the data query. Query interpretive engine module 229 may generate the query plan based at least in part on the solve order determined by solve order module determination module 231 and a partitioning of the input data (e.g., the input grid) to a plurality of sub-grids to be evaluated by grid partition module 233.

In some embodiments, system 200 comprises solve order determination module 231. System 200 uses solve order determination module 231 to determine a solve order for evaluating the query. In some embodiments, the solver order includes evaluating the following steps in sequence: (a) evaluate loaded data points and input data points; (b) evaluate calculated data points that are based only on a loaded data point(s) and/or input data points; (c) evaluate all calculated accounts that depend on other calculated data points but that do not depend on allocation data points or metric data points; (d) evaluate aggregation data points that are based on the data points evaluated in (a) and/or (b); (e) evaluate metric data points; (f) evaluate metric data points and/or calculated data points that depend on another metric data point; (g) evaluate allocated data points and calculated data points that are based on the evaluated allocated data points; and (h) evaluate aggregated data points that depend on allocated data points and/or calculated data points.

With respect to data points evaluated in (a), the loaded data points and input data points have a solve order of zero. These data points are the first data points to be retrieved and analyzed.

With respect to data points evaluated in (b), calculated data points that are dependent only on the input data points and the loaded data points have a solve order of one. For example, these calculated data points are the first data points to be computed.

With respect to data points evaluated in (c), the calculated data points that are based on other calculated data points (e.g., calculated accounts) and that do not depend on an allocation data point or a metric data point have a solve order of two. The order for evaluation of these calculated data points is based on a dependency analysis and/or a dependency order.

Figure 10A:
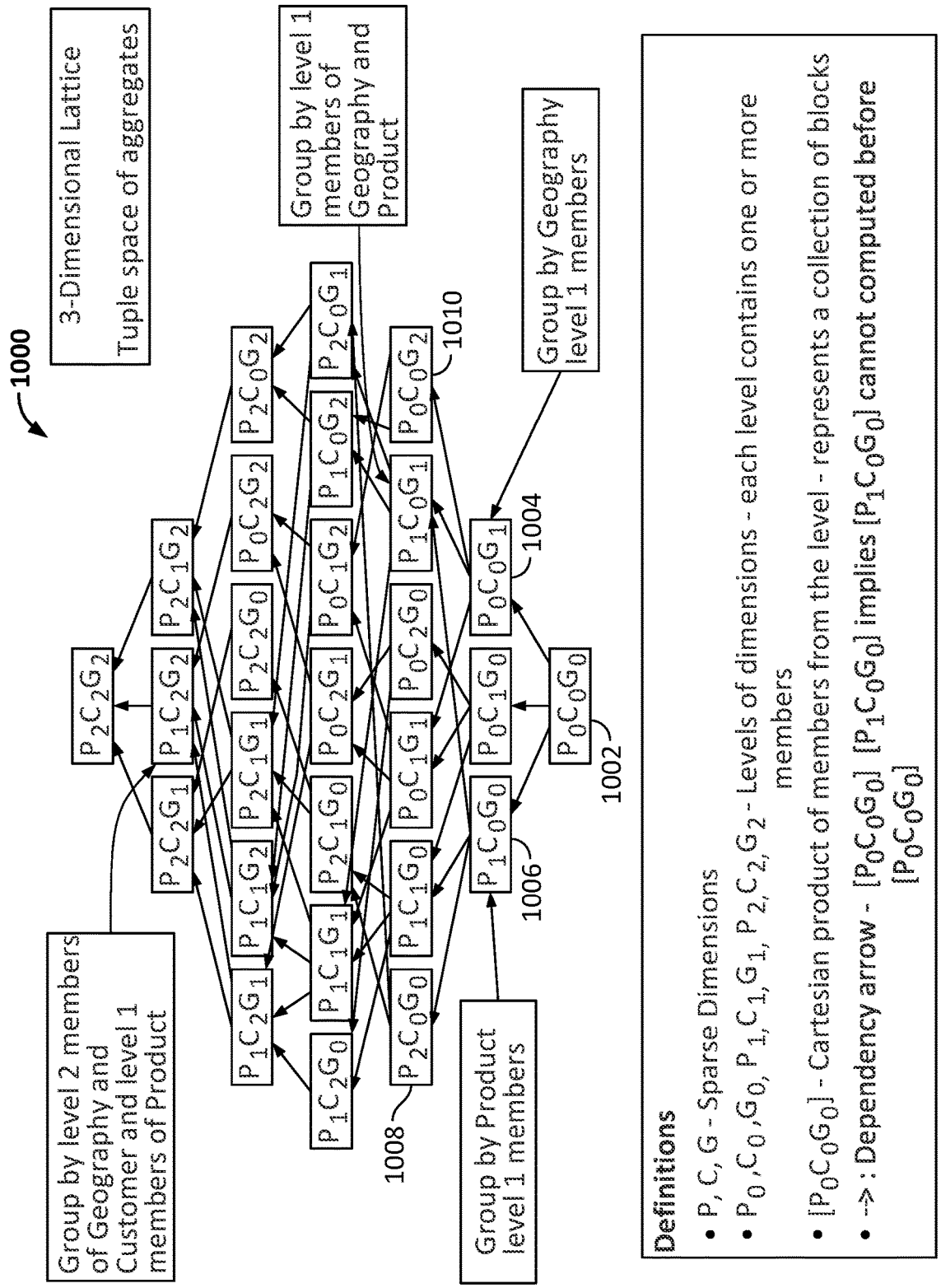
FIG. 10A is a diagram of arranging data points for an input grid in a hierarchy of levels that define at least part of a solve order for the query according to various embodiments of the present application.
Figure 10B:
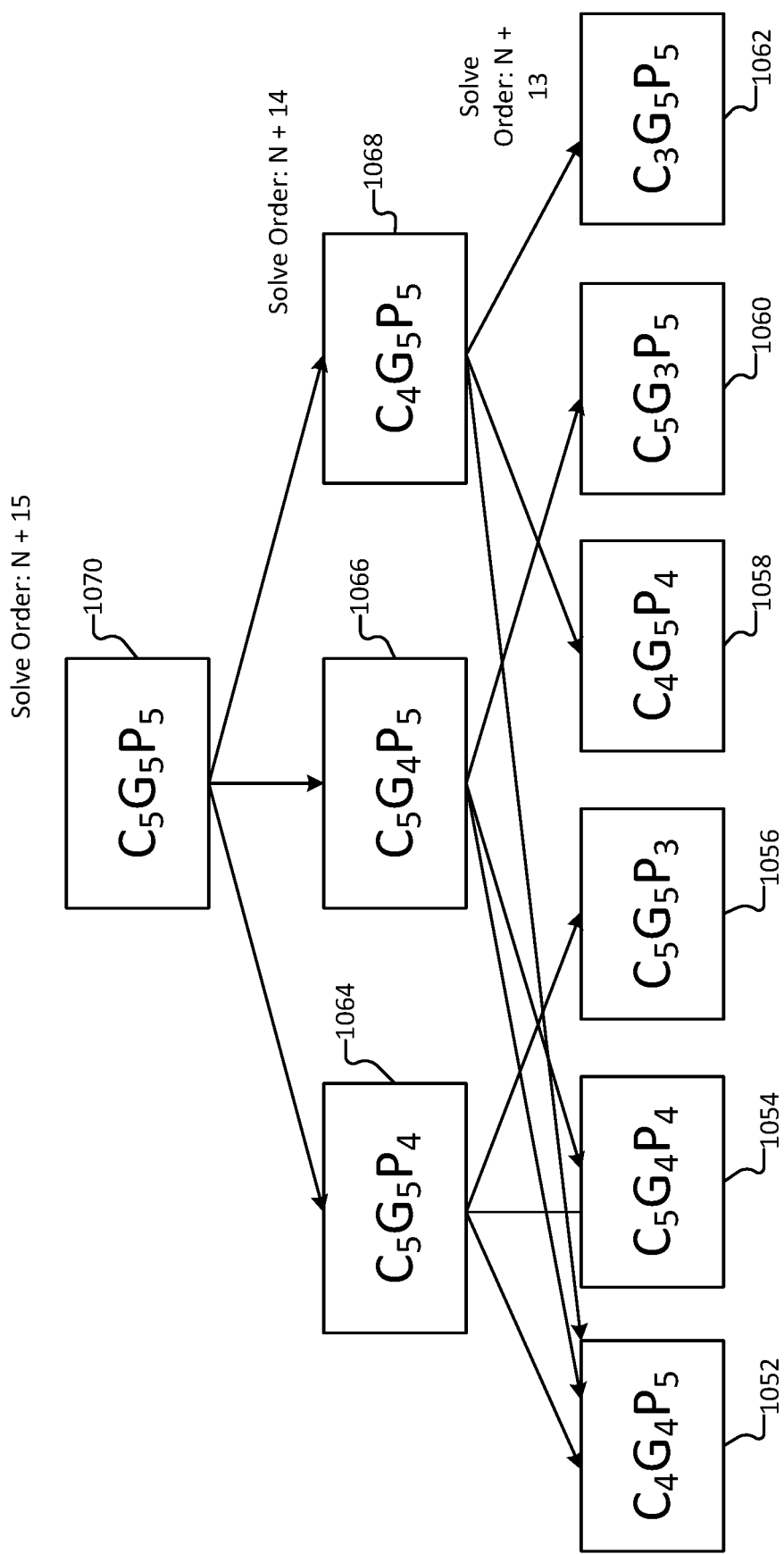
FIG. 10B is a diagram of arranging aggregated data points to define a solve order for the aggregated data points according to various embodiments of the present application.

With respect to data points evaluated in (d), the aggregated data points are evaluated in an order based at least in part on the sum of the heights of the dimensions for the particular data point. As illustrated in FIGS. 10A and 10B, the aggregated data points can be represented in a lattice. Each node in the lattice represents a set of tuples (or points) formed by a Cartesian product of members from those respective dimensions. In some embodiments, solve order for the aggregated data points is based on assigning to each node a unique integer using an algorithm that iterates from leaves upward through each dimension iteratively.

Referring to FIG. 10B, a node, such as node 1052, is represented as a tuple along the dimensions of customer (e.g., denoted by C), geography (e.g., denoted by G), and product (e.g., denoted by P). Node 1052 is represented as the tuple $C_4G_4P_5$. The subscript for each dimension indicates the height from the leaf level along that dimension. For example, $C_4$ of node 1052 indicates that node 1052 has a height of 4 from the leaf in the customer dimension. The solve order for each of the tuples (e.g., each of the nodes) is the sum of their heights. For example, the solve order for node 1052 is the sum of the height in the customer dimension (e.g., 4), the height in the geography dimension (e.g., 4), and the height in the product dimension (e.g., 5), which equals 13. In some embodiments, to account for the evaluation of data points from (a), (b), and (c), which are evaluated before the aggregated data points, the system introduces a first buffer value (e.g., denoted by N) by which the computed solve order using the sum of the heights of the applicable dimension is increased to ensure that the solve order value of aggregated data points is always higher than the solve order value of the data points evaluated in (a), (b), and (c). N is a positive integer. As an example, the system sets N equal to 100. However, various other first buffer values may be implemented. Using the first buffer value of N=100, the adjusted solve order for node 1052 is N+13 (or 113). As an illustrative example of solve order for another node of the lattice illustrated in FIG. 10B, the solve order for node 1066 is equal to the sum of the heights along each of the dimensions for customer, geography, and product, which is 5+4+5=14. Adjusting the solve order for node 1066 with the first buffer value, the adjusted solve order is N+14 (or 114). Thus, because node 1066 has a higher solve order than node 1052, node 1066 would be evaluated after evaluation of node 1052 (and any other intervening nodes having a lower solve order than node 1066).

With respect to data points evaluated in (e), the metric data points are evaluated in an order based at least in part on the sum of the heights of all dimensional hierarchies. Metric accounts are always computed along a flat line (i.e., all their dependents are at the same "height"). So, metric accounts for any "height" can be safely computed at the end after all the aggregated points are computed at that "height", which will have dependents at lower level. Metric account examples include a percentage of something, a ratio of something, etc., where both the numerator and the denominator are at the same height. The sum of the heights of all dimensional hierarchies is denoted by positive integer M. Similar to determining the solve order for the aggregated data points in (d), the system introduces a second buffer value. As an example, the second buffer value may be set at 100, however, various other values may be implemented. The second buffer value may be selected to ensure that the solve order value for the data point being evaluated in (e) is always higher than the solver order value for a data point being evaluated in (d). Accordingly, the solve order for a metric data point being evaluated in (e) is equal to N+M+the second buffer value.

With respect to data points evaluated in (f), metric and calculated data points based on metric data points (e.g., metric data points evaluated in (e) or earlier in (f)) have a solve order value that is higher than the solve order value for the metric data point on which the data point being evaluated depends. For example, a metric data point or calculated data point in (f) will have a solve order value higher than N+M+the second buffer value if M corresponds to the sum of all dimensional hierarchies. The order for evaluation of these metric data points or calculated data points is based on a dependency analysis and/or a dependency order. A positive integer variable R is set to the maximum value of the respective solve orders for the metric and calculated data points evaluated in (f).

With respect to data points evaluated in (g), the allocated data points have a solve order value higher than R. For example, the solve order for the allocated data points evaluated in (g) begins at R+1. The order for evaluation of these allocated data points is based on a dependency analysis and/or a dependency order. A positive integer variable S is set to the maximum value of the respective solve orders for the metric and calculated data points evaluated in (g).

With respect to data points evaluated in (h), aggregated data points that depend on the allocated data points and/or calculated data points evaluated in (a)-(g) have a solve order value higher than S. For example, the solve order for the allocated data points evaluated in (g) begins at S+1. The order for evaluation of these aggregated data points is based on a dependency analysis and/or a dependency order. A positive integer variable T is set to the maximum value of the respective solve orders for the aggregated data points evaluated in (h).

Thereafter, solve order determination module 231 determines solve order for data points (e.g., accounts) that depend on data points evaluated in (a)-(h) that have a solve order value starting at T+1. The order for evaluation of these aggregated data points is based on a dependency analysis and/or a dependency order.

According to various embodiments, solve order determination module 231 computes the solve order in accordance with the solve orders determined for the data points evaluated in (a)-(h). The computation of the solve order imposes a total order of the datapoints over the multi-dimensional space, and provides an execution sequence for evaluating the query. In some embodiments, the solve order values can be computed statically and in linear time and space and proportional to the size of the data model. In some embodiments, the use of a solve order enables system 200 to perform a single pass over the entire data space to evaluate the query, and system 200 computes the data points based on the solve order.

In some embodiments, system 200 comprises grid partition module 233. System 200 uses grid partition module 233 to partition the input data (e.g., the input grid) for a received query. Grid partition module 233 obtains the input data from query interpretive engine module 229 and partitions the input data based at least in part on the solve order. In some embodiments, system 200 partitions the input grid into a plurality of sub-grids so that no two accounts/data points from different sets of data points evaluated in (a)-(h) described above with respect to solve order determination module 231 are in the same sub-grid. In some embodiments, the sub-grids have datapoints that have an increasing solve order, which enables execution of the sub-grids in the order of data points evaluated in (a)-(h). In some embodiments, with respect to a particular sub-grid (e.g., for each sub-grid), each column within the sub-grid comprises members (e.g., data points) from the corresponding dimension at different levels.

According to various embodiments, each input grid or sub-grid of the input grid may be partitioned into a plurality of grids. The input grid or sub-grid is partitioned based at least in part on the sum of the heights of the members for the grid being partitioned. In some embodiments, system 200 (i) forms a grid of all leaf-level members (e.g., data points for the dataset that are to be invoked in evaluation of the query), and (ii) forms multiple grids (e.g., sub-grids) with leaf members in all dimensions except one dimension along which members of height 1 are obtained, and repeats the forming of multiple grids for all columns to obtain k grids for k dimensional columns. The forming of multiple grids is repeated for each dimensional height (e.g., height 2, height 3, etc.). The sum of all dimensional heights is represented as positive integer M. Thus, system 200 forms M*k grids (e.g., sub-grids). In response to obtaining the multiple grids (e.g., the sub-grids to be evaluated in connection with the query evaluation), system 200 orders the grids and provides an execution sequence. In some embodiments, in a given height, the different k grids can be executed in any order.

In some embodiments, system 200 comprises indexing module 235. System 200 uses indexing module 235 to index the input data, for example, the input grid and plurality of sub-grids. System 200 may index each member to be evaluated and/or used to be evaluated in connection with processing a query. For example, each member in the grid(s) (e.g., input grid, sub-grid(s)) is assigned an internal identifier and the grids are represented using a matrix of numbers. Each number is represented as a BigInteger.

In some embodiments, indexing module 235 computes the index of each data point (or tuple) (m1, m2, m3, . . . , mk), as $m1*p2*p3* \ldots pk+m2*p3* \ldots pk+ \ldots +mk-1*pk+mk$, where m1, m2, . . . mk are internal identifiers (IDs) of members and p1, p2, ..., pk are the cardinality of the dimensions. Indexing each point in this manner forms a total order on all the points in the multi-dimensional space. At scale, the index can be extremely large. Accordingly, in some embodiments, the index of each point is represented as a BigInteger to store. The input data (e.g., the data points to be evaluated for the query) is also organized based on this indexing schema.

In some embodiments, the index of the input data is stored separately from the data itself. For example, the index for the input data is then stored as a B-TREE or another disk-based structure. In some embodiments, the entire index and/or the entire leaf level (or total input set) is not required to be resident in memory.

In some embodiments, system 200 comprises grid computation module 237. System 200 uses grid computation module 237 to evaluate a set of one or more grids, such as the plurality of sub-grids for the input data pertaining to the query. Grid computation module 237 evaluates a particular grid without materializing the entire grid (e.g., by computing a Cartesian product). Materializing the entire grid is costly because the grid can be extremely large.

In some embodiments, grid computation module 237 performs a smart range scan. The smart range scan can include starting at a left most point in the index and searching for the value in the index (e.g., in the B-tree). If the value is present in the index, the value is returned. Additionally, the next value in the index is returned. If the value is not present in the index, the next value in the index is returned. As an illustrative example, grid computation module 237 searches the index for tuple (2, 1, 4) which maps to 20104. However, if 20104 is outside the left most value in the index, instead of returning an empty value, a next index value is returned, for example (141,208) which is mapped to 141208. The index value 141208 maps between tuples (12, 10, 7) and (14, 13, 11). The system then searches for the next tuple, which in this example is (14, 13, 11) that is mapped to 141311. The next value after 141311 may be tuple (23, 14, 17) mapped to 231417. Grid computation module 237 searches for this value and in response to determining that the index comprises this value, the index value is output (e.g., written to an output buffer). In response to returning the index value for tuple (23, 14, 17), grid computation module 237 searches for the next tuple, such as tuple (23, 14, 22) mapped to 231422.

In some embodiments, grid computation module 237 implements dynamic programming in connection with evaluating the grid. In some embodiments, system 200 (e.g., indexing module 235) maintains at least two indices: an input data tree index and a computed data tree index. The input data tree index corresponds to an index referencing input data points (e.g., input data points for the grid being evaluated). The computed data tree index corresponds to an index for data points computed during evaluation of the grid. In some embodiments, the computed data tree index is persisted for at least the lifetime of the query.

In some embodiments, grid computation module 237 merges the input data tree index and the computed data tree index to combine the ordered index of points to be used further in evaluating the grid. Grid computation module 237 uses the combined ordered index of data points to compute the applicable data points on a grid-by-grid basis in the solver order sequence (e.g., the solve order determined by solve order determination module 231). In response to the determination (e.g., computation) of newly computed data points, grid computation module 237 stores the newly computed data points in the computed data tree index (or stores the newly computed data points in association with a pointer in the computed data tree index).

For grids that have upper-level members (e.g., data points to be evaluated that have higher levels), each upper-level member is translated into all its children to obtain a new sub-grid and the grid is computed in the same manner as described above (e.g., using the applicable ordered index of data points, evaluating the grid in accordance with the solve order, and saving any computed data points).

According to various embodiments, the indexing of computed data points in the computed data index tree enables system 200 to not duplicate computation of data points that are used multiple times over the course of evaluating the query. For example, the indexing of computed data points can enable system 200 to never re-compute the same sub-aggregate.

In some embodiments, system 200 implements a dynamic programming to solve a class of problems that have overlapping subproblems. For example, system 200 stores computed values/data points in the computed data index tree. The dynamic programming techniques memorize or tabulate the computed values, which can be re-used when such values are requested again in connection with evaluating the query (e.g., evaluating the plurality of sub-grids). System 200 (e.g., solve order determination module 231) analyzes the model to determine/assign a solve order to different types of data points, and system 200 (e.g., indexing module 235) creates an index for the input data. The index may be organized in the form of a B-tree based on the tuple index as the ordering sequence.

In some embodiments, system 200 comprises grid parallelization module 239. System 200 uses grid parallelization module 239 to parallelize evaluation of the query with respect to a plurality of sub-grids. Grid parallelization module 239 determines which sub-grids can be parallelized and causes at least a subset of such sub-grids to be executed in parallel (e.g., grid parallelization module 239 causes a cluster of worker nodes to execute the subset of sub-grids in parallel). In some embodiments, grid parallelization module 239 determines the sub-grids to be evaluated in parallel based at least in part on determining the dependencies across sub-grids. For example, two sub-grids for which data points for one sub-grid are not dependent on data points for a second sub-grid may be parallelized. Conversely, if evaluation of at least one data point in a first sub-grid depends on a data point in a second sub-grid, then the two sub-grids may not be evaluated in parallel.

In some embodiments, system 200 comprises query response module 241. System 200 uses query response module 241 to aggregate the data obtained for query evaluation with respect to the various partitions (e.g., the plurality of sub-grids). The data may be aggregated in accordance with the definition of the solve order or other query plan according to which the query is evaluated.

In some embodiments, system 200 comprises user interface module 243. System 200 uses user interface module 243 in connection with configuring information (or the display thereof) to be provided to the user such as via client system 140 and/or administrator system 130 of system 100. In some embodiments, user interface module 243 configures a user interface to be displayed at a client system, such as an interface that is provided in a web browser at the client system. User interface module 243 may configure a user interface via which a query may be input. In some embodiments, user interface module 243 configures a user interface to provide a response to the query, such as by providing one or more reports of information that is responsive to a query or task executed with respect to the source dataset(s) (e.g., a query or task executed against data stored on data store 120).

According to various embodiments, storage 215 comprises one or more of file system data 260, data space 265, and/or data indices 270. Storage 215 comprises a shared storage (e.g., a network storage system). In some embodiments, file system data 260 comprises a database such as one or more datasets (e.g., one or more datasets for one or more tenants, where a tenant comprises a client entity or group of associated users, etc.). File system data 260 comprises data such as a dataset for historical information pertaining to user activity, a human resources database, a financial database, a sales database, etc. In some embodiments, data space 265 comprises a set of data structures respectively associated with a query to be evaluated. Data space 265 may comprise the input data associated with the query, such as an input grid (e.g., a grid comprising data points that are to be used in evaluating the query) or a plurality of sub-grids (e.g., grids that are partitions for the input grid). In some embodiments, data indices 270 comprises one or more indices for the input data. For example, data indices 270 comprises an input data tree index for the input grid. As another example, data indices 270 comprises an input data tree index for a sub-grid being evaluated (e.g., a sub-grid for each partition of the input data). Additionally, data indices 270 may comprise a computed data tree index for computed data points obtained during evaluation of the query. For example, data indices 270 stores a computed data tree index for each sub-grid being evaluated. A computed data tree index may be associated with a corresponding input data tree index. For example, system 200 merges the input data tree index and the computed data tree index while evaluating the query for a particular sub-grid. In some embodiments, system 200 persists the computed data tree index for the lifetime of the query, or at least the lifetime of the query.

According to various embodiments, memory 220 comprises executing application data 275. Executing application data 275 comprises data obtained or used in connection with executing an application such as an application executing on a tenant. In some embodiments, the application comprises one or more applications that perform one or more of receiving and/or executing a query (e.g., evaluating a query against an input grid or a set of corresponding, generating a report and/or configure information that is responsive to an executed query, and/or providing to a user information that is responsive to a query or task). Other applications comprise any other appropriate applications (e.g., an index maintenance application, a communications application, a chat application, a web browser application, a document preparation application, a report preparation application, a user interface application, a data analysis application, an anomaly detection application, a user authentication application, etc.).

FIG. 3 is an example of an input grid for a query according to various embodiments of the present application. In the example shown, input grid 300 comprises a plurality of dimensions denoted as dimension $d_i$ (e.g., dimension $d_1$, dimension $d_2$, . . . dimension $d_k$). Each dimension has $p_i$ members. For example, dimension $d_1$ has members $m_{1,1}$; $m_{1,2}$; . . . $m_{1,p1}$. Similarly, dimension $d_2$ has members $m_{2,1}$; $m_{2,2}$; . . . $m_{2,p2}$. In some embodiments, each member in every dimension is assigned an internal identifier (ID). Each tuple can be represented as m1 of d1, m2 of d2, . . . , mk of dk) for K-dimensions. The tuple can be further indexed based on an index/identifier computed, for example, for tuple (m1, m2, m3, . . . , mk). The tuple identifier or index is computed m1*p2*p3* . . . pk+m2*p3* . . . pk+ . . . +mk−1*pk+mk, where m1, m2, . . . mk are internal IDs of members and p1, p2, . . . , pk are the cardinality of the dimension. In some embodiments, the tuple identifier or index is represented as a BigInteger.

Figure 4:
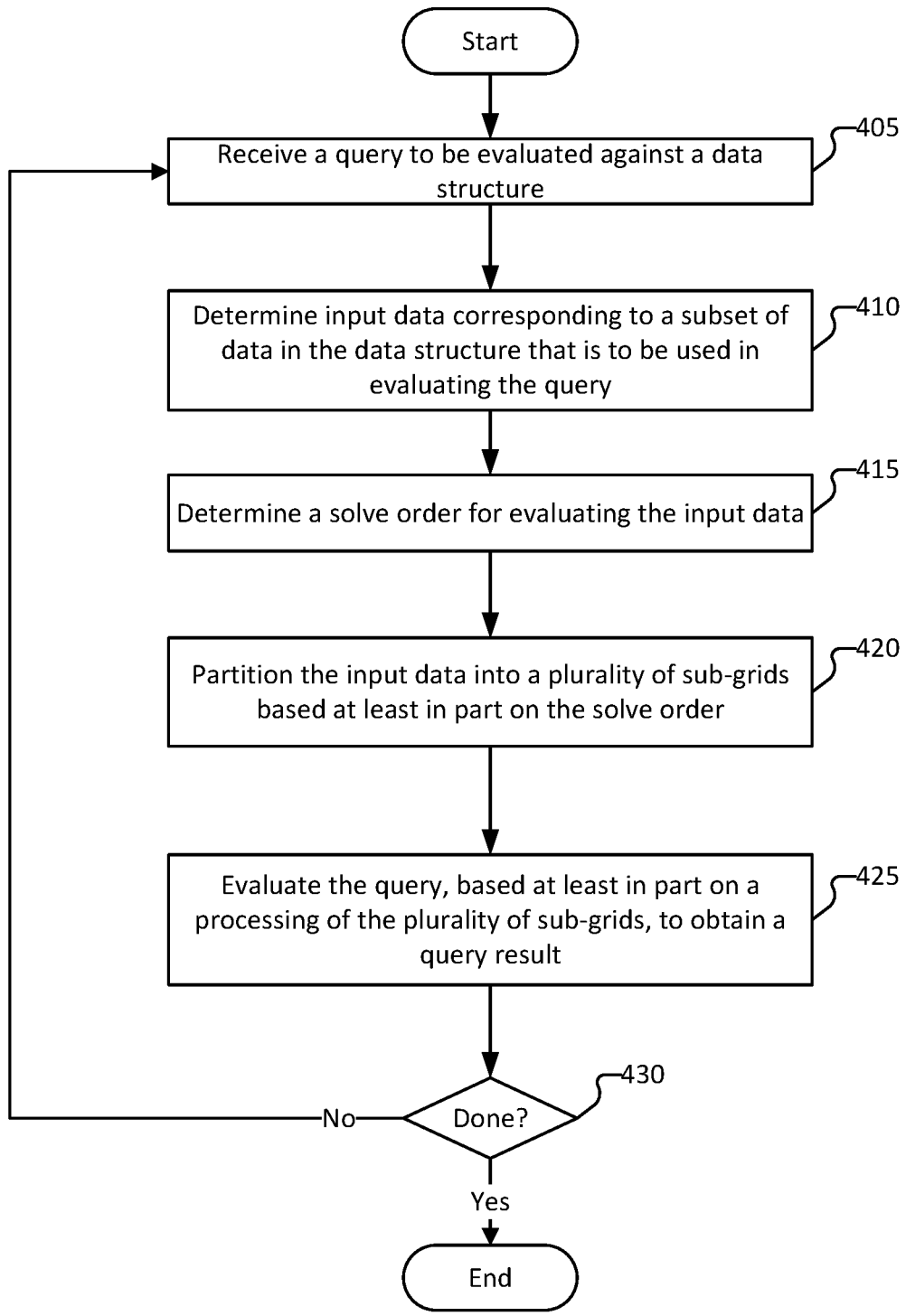
FIG. 4 is a flow diagram of a method for evaluating a query according to various embodiments of the present application.

FIG. 4 is a flow diagram of a method for evaluating a query according to various embodiments of the present application. In some embodiments, process 400 is implemented by system 100 of FIG. 1 and/or system 200 of FIG. 2.

At 405, the system receives a query to be evaluated against a data structure. At 410, the system determines input data corresponding to a subset of the data in the data structure that is to be used in evaluating the query. At 415, the system determines a solve order for evaluating the input data. For example, the solve order may be determined based at least in part on the account types to be evaluated. At 420, the system partitions the input data into a plurality of sub-grids based at least in part on the solve order. For example, the system partitions the input data to ensure that each grid does not comprise types of accounts that are associated with different solve orders. At 425, the system evaluates the query, based at least in part on a processing of the plurality of sub-grids, to obtain a query result. At 430, a determination is made as to whether process 400 is complete. In some embodiments, process 400 is determined to be complete in response to a determination that no further queries are to be processed, the response to the query has been successfully communicated, the user has exited the system, an administrator indicates that process 400 is to be paused or stopped, etc. In response to a determination that process 400 is complete, process 400 ends. In response to a determination that process 400 is not complete, process 400 returns to 405.

Figure 5:
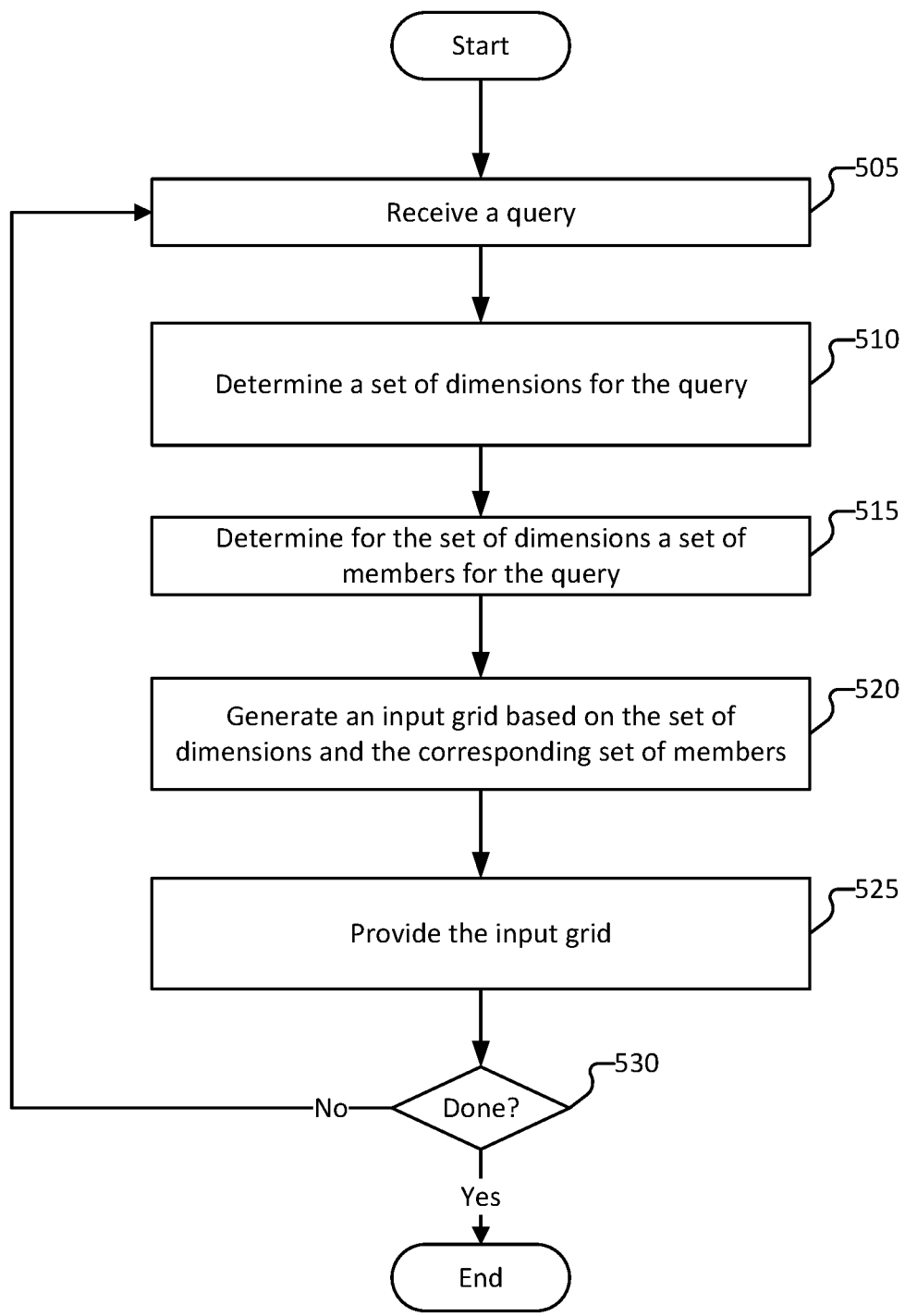
FIG. 5 is a flow diagram of a method for determining input data according to various embodiments of the present application.

FIG. 5 is a flow diagram of a method for determining input data according to various embodiments of the present application. In some embodiments, process 500 is implemented by system 100 of FIG. 1 and/or system 200 of FIG. 2. Process 500 may be invoked in connection with process 400, such as at 410 of process 400.

At 505, the system receives a query. At 510, the system determines a set of dimensions for the query. At 515, the system determines for the set of dimensions a set of members for the query. At 520, the system generates an input data grid based on the set of dimensions and the corresponding set of members. At 525, the system provides the input grid. In some embodiments, the system provides the input grid to another system, service, or process that invoked process 500, such as 410 of process 400. At 530, a determination is made as to whether process 500 is complete. In some embodiments, process 500 is determined to be complete in response to a determination that no further queries are to be processed, no further requests are to be created, the response to the query has been successfully communicated, the user has exited the system, an administrator indicates that process 500 is to be paused or stopped, etc. In response to a determination that process 500 is complete, process 500 ends. In response to a determination that process 500 is not complete, process 500 returns to 505.

Figure 6:
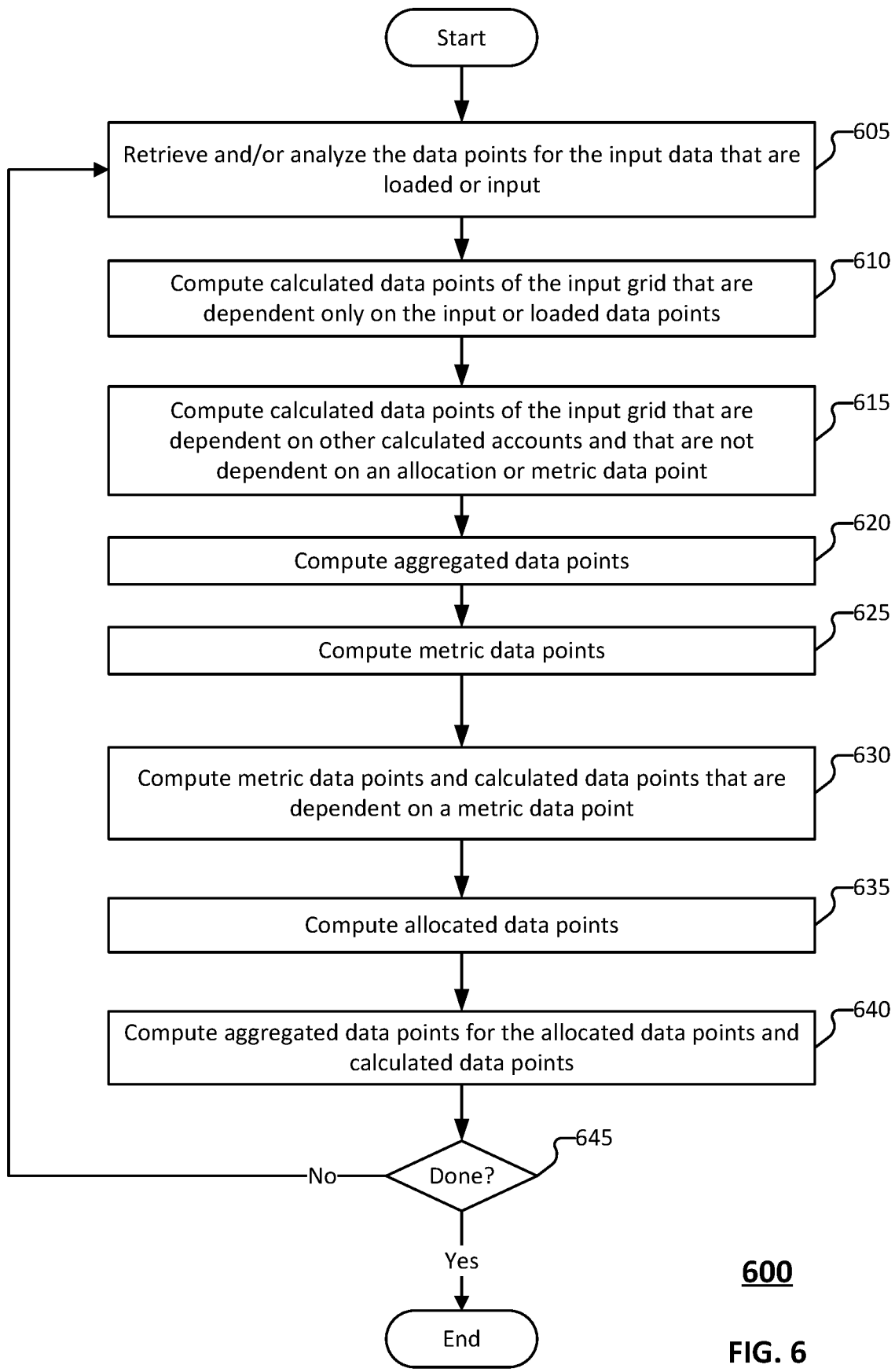
FIG. 6 is a flow diagram of a method for executing at least part of a query over a solve order according to various embodiments of the present application.

FIG. 6 is a flow diagram of a method for executing at least part of a query over a solve order according to various embodiments of the present application. In some embodiments, process 600 is implemented by system 100 of FIG. 1 and/or system 200 of FIG. 2. Process 600 may be invoked by process 400, such as at 415 and/or 425.

At 605, the system retrieves and/or analyzes the data points for the input data that is loaded or input. At 610, the system computes calculated data points of the input grid that are dependent only on the input or loaded data points. At 615, the system computes calculated data points of the input grid that are dependent on other calculated accounts and that are not dependent on an allocation or metric data point. At 620, the system computes aggregated data points. At 625, the system computes metric data points. At 630, the system computes metric data points and calculated data points that are dependent on a metric data point. At 635, the system computes allocated data points. At 640, the system computes aggregated data points for the allocated data points and calculated data points. At 645, a determination is made as to whether process 600 is complete. In some embodiments, process 600 is determined to be complete in response to a determination that no further queries are to be processed, no further data points in the input grid (or sub-grid of the input grid) are to be computed, the response to the query has been successfully communicated, the user has exited the system, an administrator indicates that process 600 is to be paused or stopped, etc. In response to a determination that process 600 is complete, process 600 ends. In response to a determination that process 600 is not complete, process 600 returns to 605.

Figure 7:
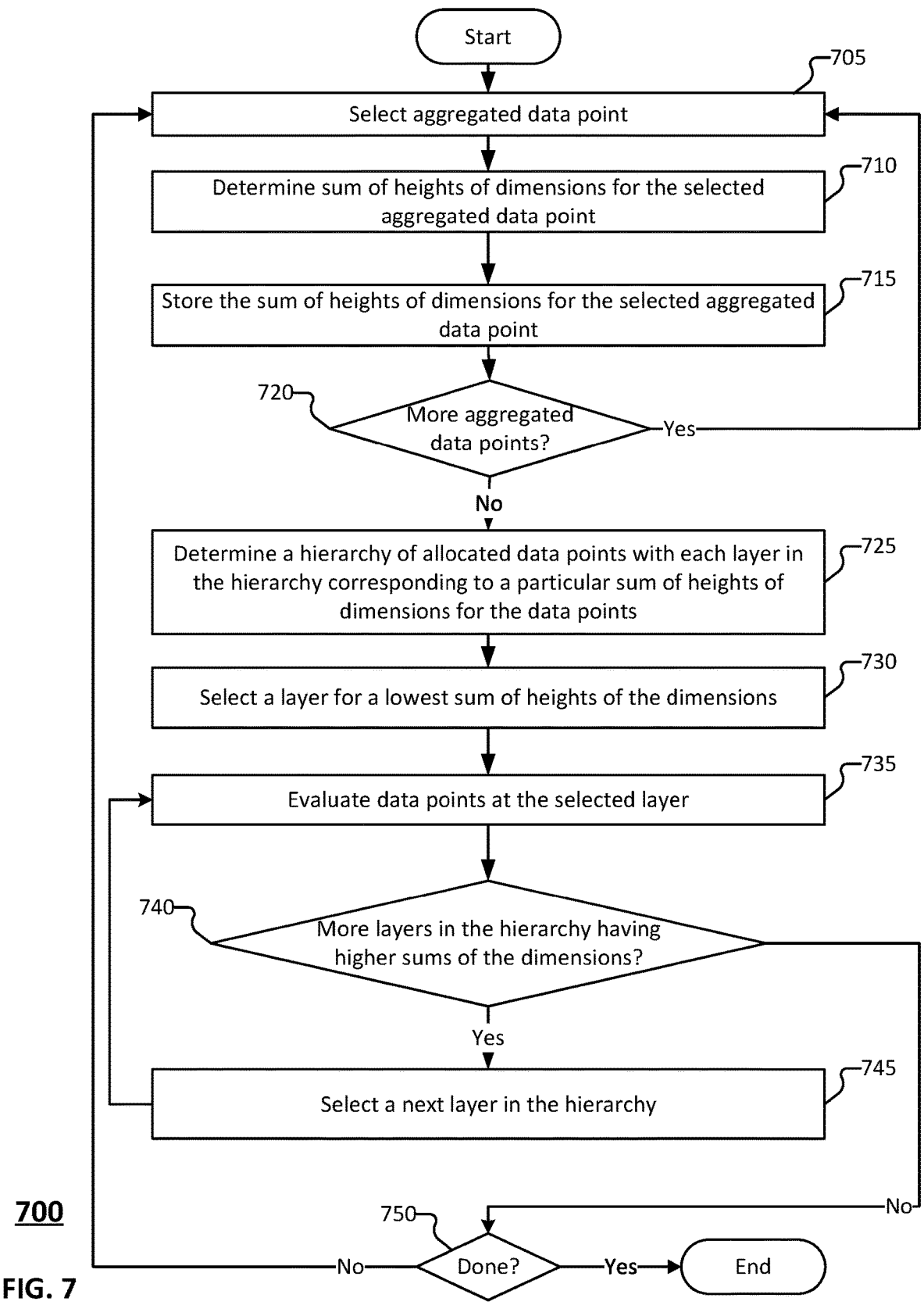
FIG. 7 is a flow diagram of a method for evaluating the query at aggregated data points according to various embodiments of the present application.

FIG. 7 is a flow diagram of a method for evaluating the query at aggregated data points according to various embodiments of the present application. In some embodiments, process 700 is implemented by system 100 of FIG. 1 and/or system 200 of FIG. 2. Process 700 may be invoked by process 400, such as at 415. Process 700 may be invoked by process 600, such as at 620.

At 705, the system selects an aggregated data point.

At 710, the system determines a sum of heights of dimensions for the selected aggregated data point.

At 715, the system stores the sum of heights of dimensions for the selected aggregated data point.

At 720, the system determines whether a sum of heights of dimensions for one or more other aggregated data points is to be determined. In response to determining that the sum of heights of dimensions is to be determined for another aggregated data point, process 700 returns to 705 and process 700 iterates over 705-720 until no further aggregated data points are to be analyzed for determining a sum of the corresponding dimensions. Conversely, in response to determining that no further sum of heights of dimensions is to be determined for aggregated data points, process 700 proceeds to 725.

At 725, the system determines a hierarchy of allocated data points with each layer in the hierarchy corresponding to a particular sum of heights of dimensions for the data points.

At 730, the system selects a layer for a lowest sum of heights of the dimensions.

At 735, the system evaluates the data points at the selected layer.

At 740, the system determines whether data points for one or more other layers having higher sums of the dimensions are to be evaluated. In response to determining that data points for one or more other layers are to be computed, process 700 proceeds to 745 at which a next layer in the hierarchy is selected. For example, the system selects a layer having a next-lowest sum of heights of the dimensions. Process 700 iterates over 735-745 until no further layers exist for which data points are to be evaluated. In response to determining that no further layers exist for which data points are to be evaluated at 740, process 700 proceeds to 750.

At 750, a determination is made as to whether process 700 is complete. In some embodiments, process 700 is determined to be complete in response to a determination that no further queries are to be processed, no further aggregated data points are to be computed, the response to the query has been successfully communicated, the user has exited the system, an administrator indicates that process 700 is to be paused or stopped, etc. In response to a determination that process 700 is complete, process 700 ends. In response to a determination that process 700 is not complete, process 700 returns to 705.

Figure 8:
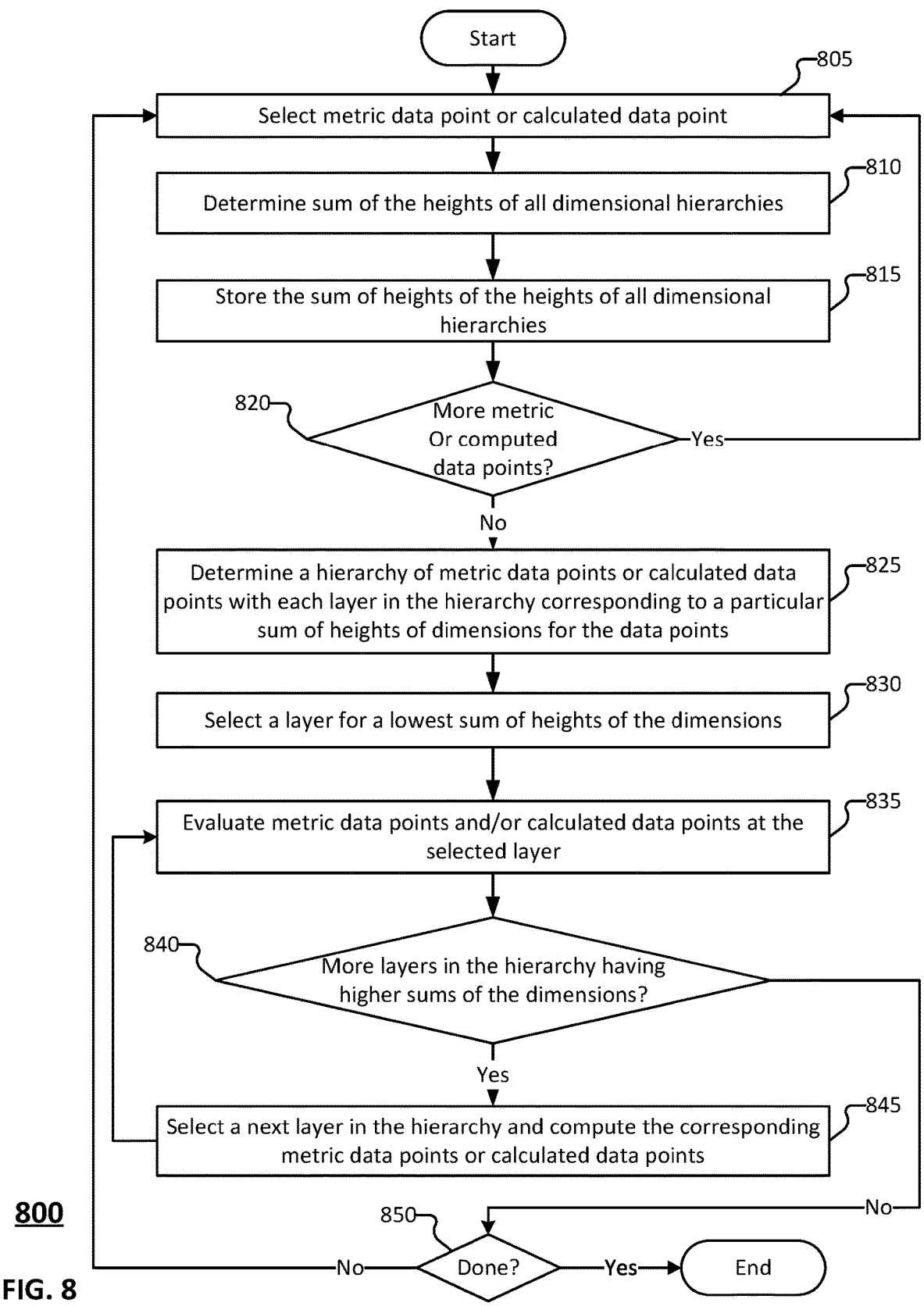
FIG. 8 is a flow diagram for evaluating a query at metric data points or computed data points according to various embodiments of the present application.

FIG. 8 is a flow diagram for evaluating a query at metric data points or computed data points according to various embodiments of the present application. In some embodiments, process 800 is implemented by system 100 of FIG. 1 and/or system 200 of FIG. 2. Process 800 may be invoked by process 400, such as at 415, or by process 600, such as at 630.

At 805, the system selects a metric data point or a calculated data point.

At 810, the system determines a sum of heights of all dimensional hierarchies.

At 815, the system stores the sum of heights of all dimensions dimensional hierarchies.

At 820, the system determines whether a sum of heights of all dimensional hierarchies for one or more other metric data points or computed data points is to be determined. In response to determining that the sum of heights of all dimensional hierarchies is to be determined for another metric data point or computed data point, process 800 returns to 805 and process 800 iterates over 805-820 until no further metric data point or computed data point is to be analyzed for determining a sum of the dimensional hierarchies. Conversely, in response to determining that no further sum of heights of dimensional hierarchies is to be determined, process 800 proceeds to 825.

At 825, the system determines a hierarchy of metric data points and/or computed data points with each layer in the hierarchy corresponding to a particular sum of heights of all the dimensional hierarchies.

At 830, the system selects a layer for a lowest sum of heights of all the dimensional hierarchies.

At 835, the system evaluates the data points at the selected layer.

At 840, the system determines whether data points for one or more other layers having higher sums of all the dimensional hierarchies are to be evaluated. In response to determining that data points for one or more other layers are to be computed, process 800 proceeds to 845 at which a next layer in the hierarchy is selected. For example, the system selects a layer having a next-lowest sum of heights of all the dimensional hierarchies. Process 800 iterates over 835-845 until no further layers exist for which data points are to be evaluated. In response to determining that no further layers exist for which data points are to be evaluated at 840, process 800 proceeds to 850.

At 850, a determination is made as to whether process 800 is complete. In some embodiments, process 800 is determined to be complete in response to a determination that no further queries are to be processed, no further metric data points or calculated data points (e.g., that do not depend on another metric data point or calculated data point) are to be evaluated, the response to the query has been successfully communicated, the user has exited the system, an administrator indicates that process 800 is to be paused or stopped, etc. In response to a determination that process 800 is complete, process 800 ends. In response to a determination that process 800 is not complete, process 800 returns to 805.

Figure 9:
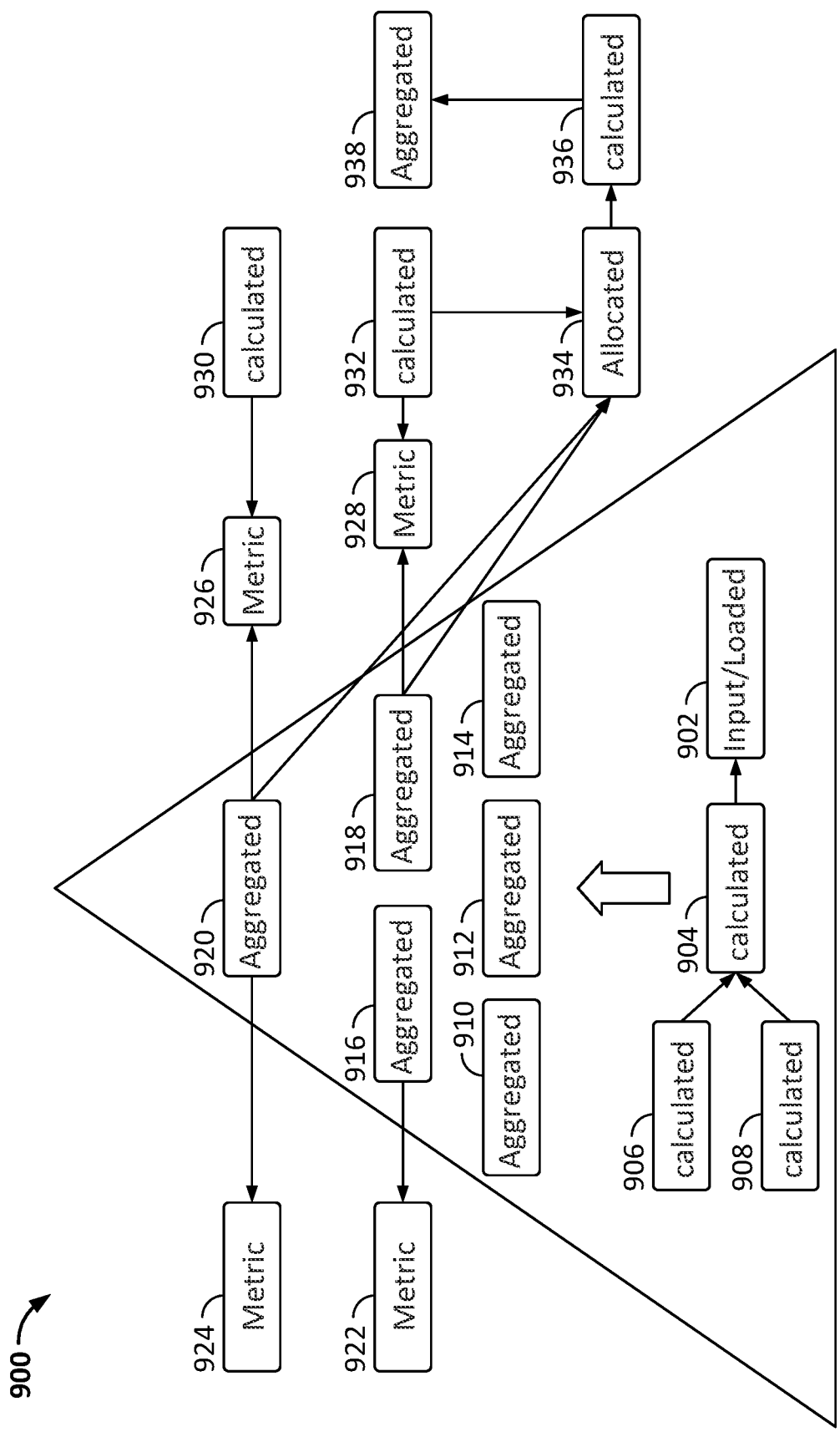
FIG. 9 is a diagram of a method for evaluating a query for a particular input grid or sub-grid in accordance with a solve order according to various embodiments of the present application.

FIG. 9 is a diagram of a method for evaluating a query for a particular input grid or sub-grid in accordance with a solve order according to various embodiments of the present application. In some embodiments, process 900 is implemented by system 100 of FIG. 1 and/or system 200 of FIG. 2. Process 900 may be invoked by process 400, such as at 415 and/or 425.

In the example shown, process 900 illustrates the execution of a query in accordance with a solve order. According to various embodiments, the determining the solve order and the partitioning an input grid in accordance with the solve order for execution of the query is performed in a single pass. Thus, pass order is not relevant to various embodiments.

Various embodiments implement the solve order by performing 902-936 sequentially, although account types of a same solve order without any dependencies may be implemented in parallel. At 902, the system first obtains the input or loaded data points. The input or loaded data points may have a solve order of 0. At 904, the system evaluates a calculated data point(s) that is dependent only on an input or loaded data point. These calculated data points have a solve order of one. At 906 and 908, the system evaluates the calculated data points that are dependent on another calculated data point (e.g., the calculated data point computed at 904). These calculated data points that are dependent on other calculated data points have a solve order of two. At 910, 912, 914, 916, 918, and 920, the system evaluates the aggregated data points. The aggregated data points can be evaluated in an order based at least in part on a sum of the heights of the respective dimensions for the data points. The solve order is determined by the sum of (i) the sum of the heights of the respective dimensions, and (ii) a buffer value N (e.g., the first buffer value). After evaluating the aggregated data points, at 922, 924, 926, and 928, metric data points are evaluated. The metric data points are evaluated in a solve order based on the sum of the heights of all dimensional hierarchies (e.g., from the smallest sum to the largest sum). After computing the metric data points, at 930 and 932, the system evaluates the metric and calculated data points that are based on other metric data points. For example, at 930, the calculated data point is based on the metric data point at 926. As another example, at 932, the calculated data point is based on the metric data point at 928. After computing the metric data points and calculated data points that depend on another metric data point, at 934, the system evaluates the allocated data points, such as the allocated data point shown to be dependent on the aggregated data points computed at 918 and 920 and the calculated data point computed at 932. Next, at 936, the system computes the calculated data points that are dependent/based on an allocated data point. In the example shown, the calculated data point computed at 936 is dependent/based on the allocated data point computed at 934. At 938, the system computes an aggregated data point that is dependent on the calculated or allocated data point(s).

FIG. 10A is a diagram of arranging data points for an input grid in a hierarchy of levels that define at least part of a solve order for the query according to various embodiments of the present application. In the example shown, lattice 1000 shows the interrelationships and hierarchies for data points in the applicable input grid. The various data points are arranged according to a sum of the dimensional heights. For example, data point 1002 has a dimensional height of 0 (e.g., a height of 0 for the dimension Product (P), a height of 0 for the dimension of Customer (C), and a height of 0 for the dimension of Geography (G)). At the next level (e.g., which can correspond to the solve order for aggregated data points), data points 1004 and 1006 have respective sums of the dimensional heights of 1. At the next level, data points 1008 and 1010 have respective sums of the dimensional heights of 2.

FIG. 10B is a diagram of arranging aggregated data points to define a solve order for the aggregated data points according to various embodiments of the present application. In some embodiments, the arrangement of data points in lattice 1050 may be used in connection with determining solve orders for a type of data point. As an example, lattice 1050 is representative of solve orders for aggregated data points (e.g., the aggregated data points determined at 620 of process 600). In the example shown, data points 1052-1062 have the same solve order because the data points have a same sum of the dimensional heights (e.g., data points 1052-1062 all have a sum of dimensional heights equal to 13). The order of solving data points within a corresponding solve order layer (e.g., data points 1052-1062) may be based on a dependency analysis. Using the example described in connection with solve order determination module 231 of system 200, data points 1052-1062 have a solve order of N+13, where N is the first buffer value. Data points 1064-1068 have a sum of dimensional heights of N+14, and thus are solved following evaluation of data points 1052-1062. Data points 1070 has a solve order of N+15, and thus evaluation follows the evaluation of data points 1064-1068.

Figure 11:
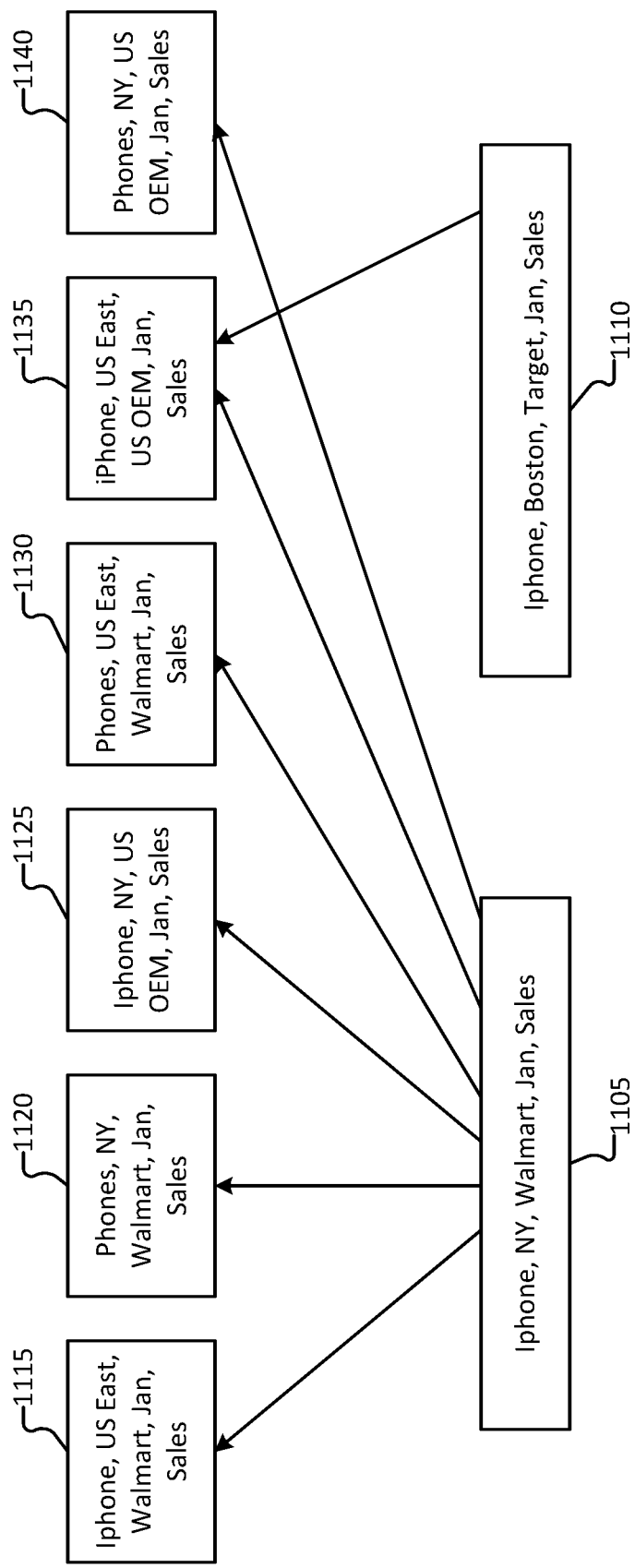
FIG. 11 is a diagram of rolling up account values into parent accounts according to various embodiments of the present application.

FIG. 11 is a diagram of rolling up account values into parent accounts according to various embodiments of the present application. According to various embodiments, a plurality of data points (e.g., accounts) can depend on the same data point. In the example shown at 1100, data points 1115-1140 all depend on data point 1105, and data point 1135 further depends on data point 1110.

In related art systems, as the system evaluated data points 1115-1140 using a different solve order technique, the system would re-compute data point 1105 to then use such value in computing data points 1115-1140. In contrast, according to various embodiments, the system uses a solve order technique that orders evaluation of data points to ensure that a first data point on which other data points depend is computed before such other data points. Further, various embodiments implement dynamic programming techniques. Accordingly, as the first data point (e.g., data point 1105) is computed, it is stored (e.g., in a leaf pool), indexed (e.g., using a computed data tree index), and persisted (e.g., at least through the computation of all dependent data points, or the lifetime of the query). As the system evaluates those other data points (e.g., data points 1115-1140) depending on the first data point, rather than re-computing the first data point, the system retrieves the computed first data point and uses that in evaluation for each of the other data points. Further, because a first set of data points 1105-1110 and the second set of data points 1115-1140 have the respective same solve orders, evaluation of data points within the respective sets of data points may be parallelized.

Figure 12:
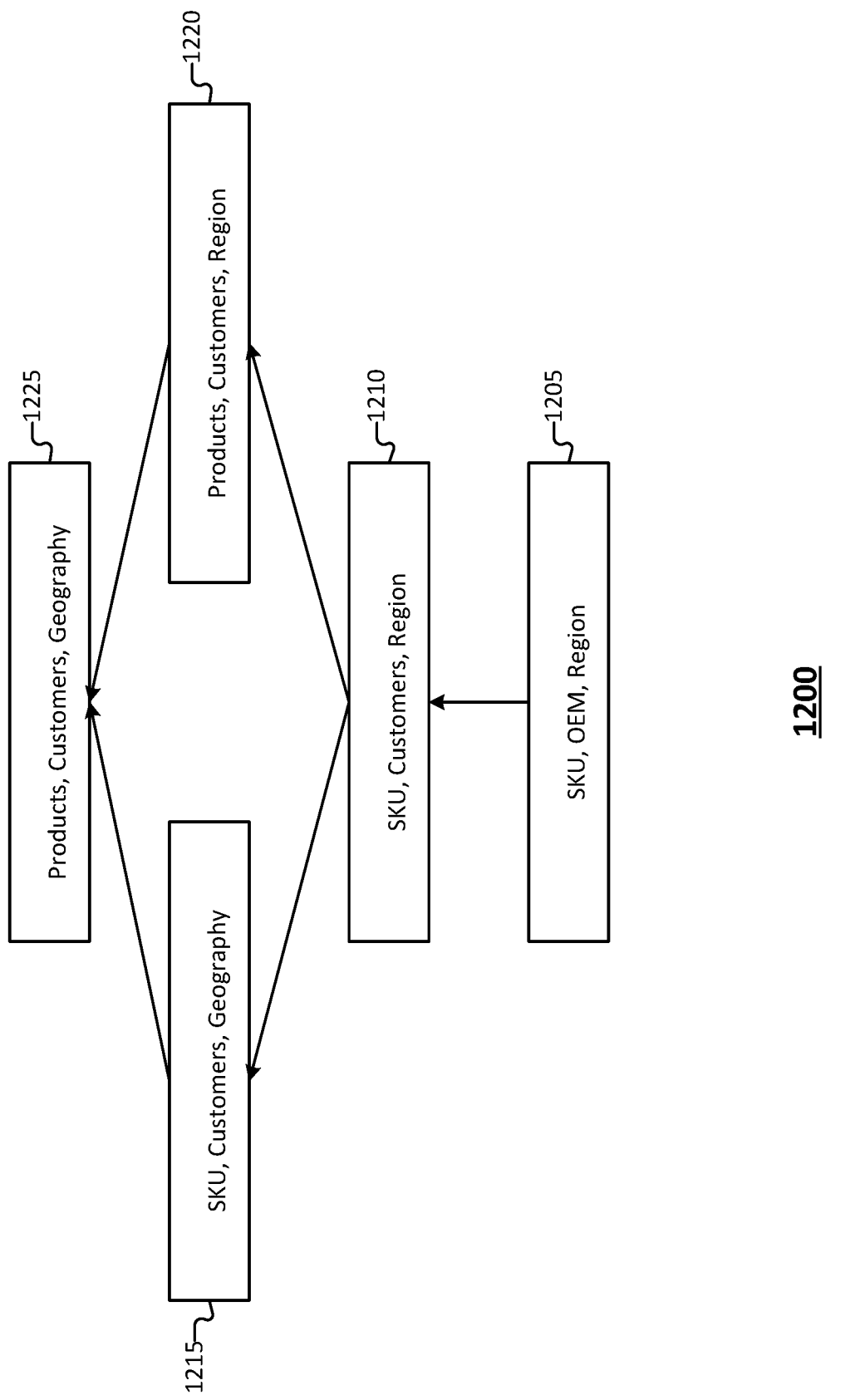
FIG. 12 is a diagram of rolling up account values into parent accounts according to various embodiments of the present application.

FIG. 12 is a diagram of rolling up account values into parent accounts according to various embodiments of the present application. In the example shown, child data points can be computed and rolled up into parent data points (e.g., accounts) that depend on the data within the child data points. In some embodiments, the system traverses these dependencies between child data points and parent data points, and evaluates the child data points before computing the parent data points so the computed child data point can be persisted and used for a plurality of subsequent data points that depend on such computed data point.

As illustrated at 1200, data point 1225 (e.g., an aggregated data point) depends on calculated data points 1215 and 1220. Each of calculated data points 1215 and 1220 depend on aggregated data point 1210, which in turn depends on data point 1205. The system thus determines the solve order to be: (a) data point 1205, (b) data point 1210, (c) data point 1215 and data point 1220, (d) data point 1225. After computation of each of the data points, the system stores and indexes the data points for use in evaluating later data points that have dependency on those earlier computed data points.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a user interface configured to input a query to be evaluated against a data structure;
   one or more processors configured to:
      receive the query to be evaluated against the data structure;
      determine input data corresponding to a subset of the data structure that is to be used in evaluating the query, wherein determining the input data comprises creating hierarchical input data tree index configured to index the subset of the data structure and enable selective identification of a data element required for evaluation of the query;
      determine and assign a solve order to data points of the input data, wherein the solve order is for evaluating the query against the input data, and the solve order is determined based on dependence relationships among the data points and used to guide evaluation of the query against the input data;
      partition the input data into a plurality of non-overlapping sub-grids, wherein the partitioning is based at least in part on the solve order and ensures that a subset of data points with an ancestor-descendant relationship are assigned to the same sub-grid;
      process the plurality of sub-grids to compute corresponding parts of the query;
      evaluate the query, based at least in part on the input data tree index and the processing of the plurality of sub-grids, to obtain a query result; and
      provide the query result to the user interface; and
   a memory coupled to the one or more processors and configured to provide the one or more processors with instructions.

2. The system of claim 1, wherein the one or more processors are further configured to:
   determine that a change has occurred to the data structure;
   determine an update to the query result necessitated by the change; and
   use the solve order to process updated computations for the update on corresponding parts of the plurality of sub-grids impacted by the update.

3. The system of claim 2, wherein processing the updated computations includes avoiding a re-computation of values that are not impacted by the change.

4. The system of claim 3, wherein the avoiding the re-computation of values that are not impacted by the change comprises:
   identifying the values that are not impacted by the change based on an index for the input data.

5. The system of claim 4, wherein the index comprises a plurality of indexes respectively corresponding to the plurality of sub-grids.

6. The system of claim 1, wherein the data structure is a hypercube having high dimensionality.

7. The system of claim 1, wherein determining the input data includes generating a leaf index for the subset of the data structure determined to be used in evaluating the query.

8. The system of claim 1, wherein the solve order comprises an order of computations from least complex to most complex.

9. The system of claim 1, wherein the solve order is determined based at least in part on a data model for the data structure.

10. The system of claim 1, wherein the plurality of sub-grids is processed based at least in part on the solve order.

11. The system of claim 1, wherein the plurality of sub-grids has no overlap with respect to each other.

12. The system of claim 1, wherein at least a subset of the plurality of sub-grids is processed in parallel.

13. The system of claim 1, wherein processing a particular sub-grid includes:
   obtaining a first index for input data points corresponding to the particular sub-grid;
   obtaining a second index for computed data points; and
   computing the input data points for the particular sub-grid to obtain newly computed data points.

14. The system of claim 13, wherein the second index is updated to comprise the newly computed data points.

15. The system of claim 13, wherein the first index and the second index are tree indices.

16. The system of claim 13, wherein the second index is persisted for a lifetime of the query.

17. The system of claim 13, wherein computing the data points for the particular sub-grid comprises:
   merging the first index and the second index to obtain an ordered index; and
   computing the data points for the particular sub-grid based at least in part on the ordered index.

18. The system of claim 17, wherein the plurality of sub-grids is processed in the solve order, and the second index used to compute the data points for the particular sub-grid is based at least in part on computed data points for a sub-grid that was previously processed.

19. The system of claim 13, wherein the evaluating the query comprises:
   determining that a roll-up value is to be computed;
   determining whether the roll-up value is dependent on one or more previously computed roll-up values stored in a leaf pool; and
   in response to determining that the roll-up value is dependent on one or more previously computed roll-up values stored in a leaf pool, retrieving the one or more previously computed roll-up values from the leaf pool based at least in part on the computed data tree index, and computing the roll-up value based at least in part on the one or more previously computed roll-up values.

20. The system of claim 13, wherein the determining, based at least in part on the input data tree index, the update to the query result necessitated by the change comprises:
  obtaining a pre-computed value that is not impacted by the change, the pre-computed value being obtained based at least in part on the computed data tree index;
  obtaining another value that is impacted by the change; and
  determining the update based at least in part on the pre-computed value and the other value.

21. The system of claim 1, wherein partitioning the input data into a plurality of sub-grids based at least in part on the solve order comprises scanning through a plurality of data elements in the input data and grouping the plurality of data elements in by data structure dimension to ensure that data elements having ancestor-descendant relationships belong to the same group.

22. The system of claim 1, wherein the evaluating the query comprises:
  determining that a change has occurred to the data structure since the query was received;
  determining, based at least in part on the input data tree index, one or more values impacted by the change;
  determining an update to the query result necessitated by the change based at least in part on the one or more values; and
  determining the query result based at least in part on the update to the query result.

23. The system of claim 1, wherein the solve order is dynamically adjusted during query evaluation based at least in part on one or more of (i) intermediate computation results, and (ii) detected data changes.

24. A method, comprising:
  receiving, by one or more processors, a query to be evaluated against a data structure, wherein the query is received from a user interface configured to input the query;
  determining input data corresponding to a subset of the data structure that is to be used in evaluating the query, wherein determining the input data comprises creating hierarchical input data tree index configured to index the subset of the data structure and enable selective identification of a data element required for evaluation of the query;
  determining and assigning a solve order to data points of the input data, wherein the solve order is for evaluating the query against the input data, and the solve order is determined based on dependence relationships among the data points and used to guide evaluation of the query against the input data;
  partitioning the input data into a plurality of non-overlapping sub-grids, wherein the partitioning is based at least in part on the solve order and ensures that a subset of data points with an ancestor-descendant relationship are assigned to the same sub-grid;
  processing the plurality of sub-grids to compute corresponding parts of the query;
  evaluating the query, based at least in part on the input data tree index and the processing of the plurality of sub-grids, to obtain a query result; and
  provide the query result to the user interface.

25. A computer program product embodied in a non-transitory computer readable medium and comprising computer instructions for:
  receiving, by one or more processors, a query to be evaluated against a data structure, wherein the query is received from a user interface configured to input the query;
  determining input data corresponding to a subset of the data structure that is to be used in evaluating the query, wherein determining the input data comprises creating hierarchical input data tree index configured to index the subset of the data structure and enable selective identification of a data element required for evaluation of the query;
  determining and assigning a solve order to data points of the input data, wherein the solve order is for evaluating the query against the input data, and the solve order is determined based on dependence relationships among the data points and used to guide evaluation of the query against the input data;
  partitioning the input data into a plurality of non-overlapping sub-grids, wherein the partitioning is based at least in part on the solve order and ensures that a subset of data points with an ancestor-descendant relationship are assigned to the same sub-grid;
  processing the plurality of sub-grids to compute corresponding parts of the query;
  evaluating the query, based at least in part on the input data tree index and the processing of the plurality of sub-grids, to obtain a query result; and
  provide the query result to the user interface.

* * * * *